United States Patent [19]
Higashimata et al.

[11] Patent Number: 5,673,981
[45] Date of Patent: Oct. 7, 1997

[54] ANTISKID BRAKING DEVICE

[75] Inventors: Akira Higashimata, Hadano; Yoshiki Yasuno, Isehara, both of Japan

[73] Assignee: Nissan Motor Co., Ltd., Yokohama, Japan

[21] Appl. No.: 561,235

[22] Filed: Nov. 21, 1995

[30] Foreign Application Priority Data

Nov. 29, 1994 [JP] Japan .................................. 6-295136

[51] Int. Cl.$^6$ ..................................................... B60T 8/62
[52] U.S. Cl. ........................................... 303/155; 303/167
[58] Field of Search ..................................... 303/155, 157, 303/159, 160, 167, DIG. 1–DIG. 4, 150; 364/426.02

[56] References Cited

U.S. PATENT DOCUMENTS

| | | | |
|---|---|---|---|
| 5,150,298 | 9/1992 | Fujioka et al. | 303/157 X |
| 5,348,380 | 9/1994 | Korasiak et al. | 303/167 |
| 5,505,526 | 4/1996 | Michels | 303/155 X |
| 5,511,863 | 4/1996 | Suh | 303/167 X |
| 5,518,307 | 5/1996 | Okazaki | 303/159 |

FOREIGN PATENT DOCUMENTS 3-246156  11/1991  Japan .

*Primary Examiner*—Josie Ballato
*Attorney, Agent, or Firm*—Lowe, Price, LeBlanc & Becker

[57] ABSTRACT

In an antiskid braking system for increasing or decreasing a braking force according to a wheel speed and a vehicle speed, an algorithm applied to the determination of a braking force decrease amount is improved. Once a target braking force decrease amount is determined according to the wheel speed and vehicle speed, this is compared with a predetermined minimum decrease amount, and when the target decrease amount is less than the minimum decrease amount, braking force is decreased according to the minimum decrease amount. The minimum decrease amount is preferably determined according to the braking force immediately before the braking force decrease. In this way, braking force reduction insufficiencies in several conditions are prevented.

4 Claims, 11 Drawing Sheets

ANTISKID BRAKING DEVICE

FIELD OF THE INVENTION

This invention relates to an antiskid brake that prevents the wheels of a vehicle from locking due to braking.

BACKGROUND OF THE INVENTION

An antiskid brake that prevents the wheels of a vehicle from locking due to braking generally reduces a braking pressure when a slip factor of a wheel increases beyond a predetermined range, and increases the braking pressure when the slip factor returns to the predetermined range.

As one criterion for controlling the pressure decrease amount, Tokkai Hei 3-246156 published by the Japanese Patent Office in 1991 discloses a method wherein a pressure decrease time is modified according to the average value of the wheel deceleration from when braking begins to when the wheel slip factor reaches a predetermined value.

According to this criterion, the pressure decrease time is shorter the larger the deceleration, and longer the smaller the deceleration. The fact that the average deceleration is large during the time from when braking begins to when the slip factor reaches the predetermined value, means that the frictional coefficient of the road surface is high and the braking pressure is high. Also, the pressure decrease amount when a pressure reduction valve is opened for the same time is larger the higher the braking pressure. By controlling the pressure decrease time based on the wheel deceleration as described hereinabove, the pressure decrease time in one pressure reduction operation is constant regardless of the braking pressure or road surface frictional coefficient.

However, if the pressure decrease amount is arranged to be constant in this way, pressure decrease insufficiencies tend to occur on wet roads where there is a large difference between the peak frictional coefficient and lock frictional coefficient, and if the pressure is again reduced after one pressure reduction, recovery of wheel speed is delayed. Also, repeating pressure reduction due to pressure insufficiency on roads with a high frictional coefficient, e.g. surfaced roads, causes vehicle deceleration to fall and increases braking time.

This kind of problem can be resolved by determining pressure decrease time not only by the wheel deceleration, but also by the vehicle deceleration. There is for example a method wherein a value obtained by dividing the result of subtracting the wheel deceleration from a predetermined value, by the vehicle deceleration, is set equal to the pressure decrease time. However even in this case, when the vehicle moves onto a road with a low frictional coefficient from a road with a high frictional coefficient during braking, pressure reduction insufficiencies still arise. In other words, even if the wheel deceleration varies sharply when the vehicle moves onto the road with a low frictional coefficient, the pressure decrease time is set too short corresponding to the road with high frictional coefficient, a pressure reduction insufficiency occurs, and wheel lock occurs without the wheel speed returning to the vicinity of the actual vehicle speed.

SUMMARY OF THE INVENTION

It is therefore an object of this invention to perform optimum braking pressure control according to variations of road surface conditions.

It is a further object of this invention to resolve pressure reduction insufficiencies on roads with a high frictional coefficient.

It is still a further object of this invention to prevent excessive pressure reductions on roads with a low frictional coefficient.

It is still a further object of this invention to increase the response of antiskid control.

In order to achieve the above objects, this invention provides an antiskid braking device for braking a wheel of a vehicle, comprising a brake pedal, a master cylinder that generates a pressure according to a depression amount of the brake pedal, a wheel cylinder that applies a braking force to the wheel according to the pressure of the master cylinder, a mechanism for detecting a rotation speed of the wheel, a mechanism for detecting a vehicle speed, a mechanism for detecting the braking force, a mechanism for computing a target decrease amount of the braking force based on the wheel speed and the vehicle speed, a mechanism for selecting a larger value of the minimum decrease amount and the target decrease amount, and a mechanism for decreasing the braking force according to the amount selected by the selecting mechanism.

It is preferable that the device further comprises a mechanism for determining the minimum decrease amount according to the braking force applied immediately before the decreasing mechanism decreases the braking force.

It is also preferable that the device further comprises a mechanism for detecting that the vehicle is traveling on a road with a high frictional coefficient, and a mechanism for increasing the minimum decrease amount when the vehicle is traveling on a road with a high frictional coefficient and the vehicle speed is less than a predetermined vehicle speed.

It is also preferable that the device further comprises a mechanism for determining a target increase amount of the braking force based on the wheel speed and the vehicle speed after the decreasing mechanism has decreased the braking force, a mechanism for increasing the braking force according to the target increase amount, and a mechanism for forcing the selecting mechanism to select the target decrease amount before the increasing mechanism increases the braking force.

The details as well as other features and advantages of this invention are set forth in the remainder of the specification and are shown in the accompanying drawings.

DESCRIPTION OF THE PREFERRED EMBODIMENTS

Figure 1:
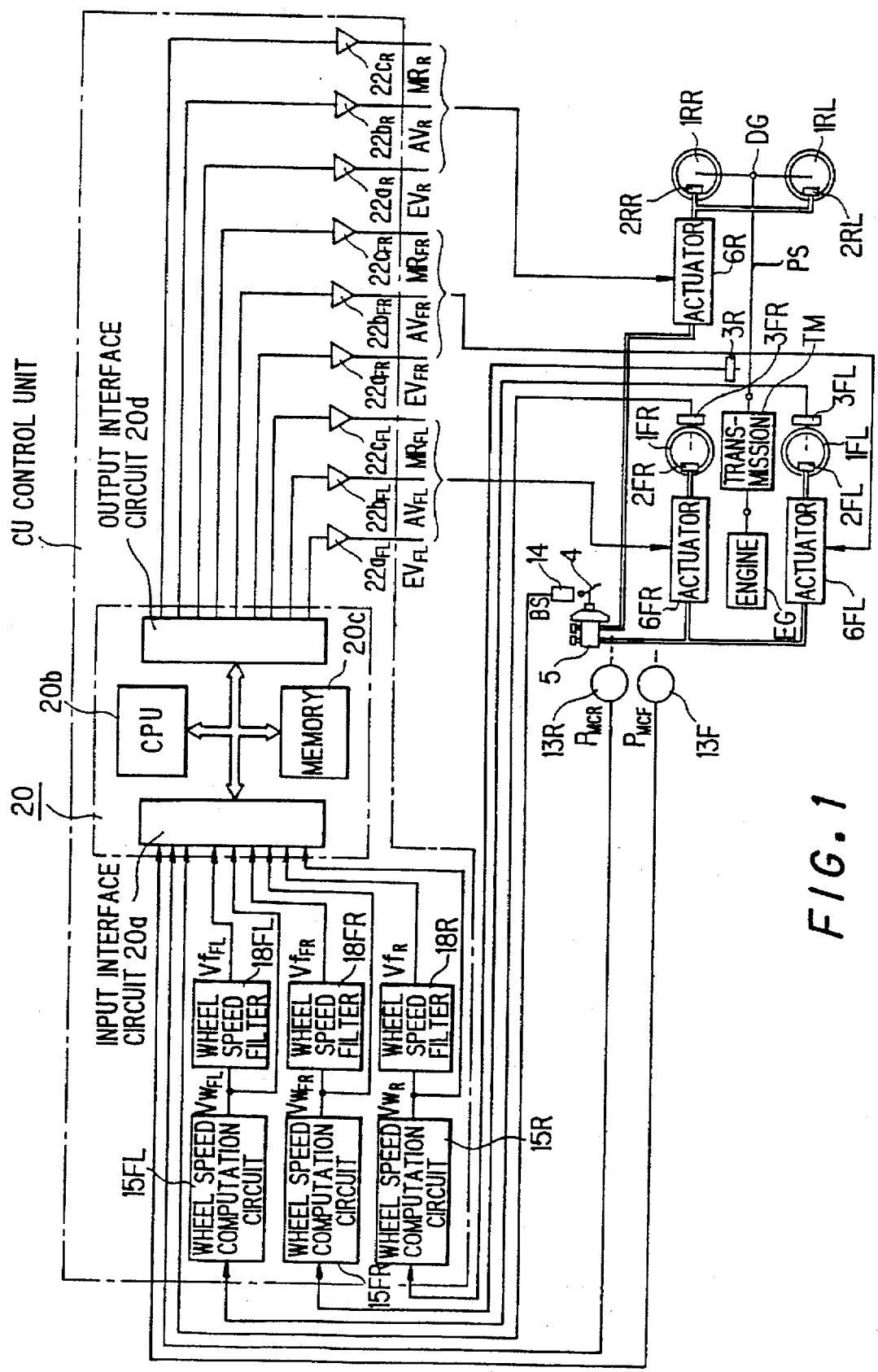
FIG. 1 is a schematic diagram of an antiskid brake system according to this invention.

Referring to FIG. 1 of the drawings, in a vehicle fitted with front wheels 1FL, 1FR and rear wheels 1RL, 1RR which are drive wheels, the rotation of an engine EG is transmitted to the rear wheels 1RL, 1RR via a transmission TM, propeller shaft PS and differential gear DG.

A braking force is applied to each wheel by oil pressure wheel cylinders 2FL, 2FR, 2RL and 2RR. The front wheels 1FL, 1FR are provided with wheel speed sensors 3FL, 3FR that output a pulse signal according to the wheel rotation speed. The propeller shaft PS is also fitted with a rotation sensor 3R that outputs a pulse signal according to the rotation speed of the shaft PS. The rotation speed of the propeller shaft PS detected by the sensor 3R corresponds to the average value of the rotation speeds of the rear wheels 1RL, 1RR.

The brake pressure of these wheel cylinders is supplied from a master cylinder 5 according to a depression amount of a brake pedal 4.

The pressure of the master cylinder 5 is supplied separately to the front wheel cylinders 2FL, 2FR via actuators 6FL, 6FR. The pressure of the master cylinder 5 is also supplied to the rear wheel cylinders 2RL, 2RR via a single actuator 6R.

The aforesaid construction is known as a 3-sensor/3-channel antiskid brake system.

Figure 2:
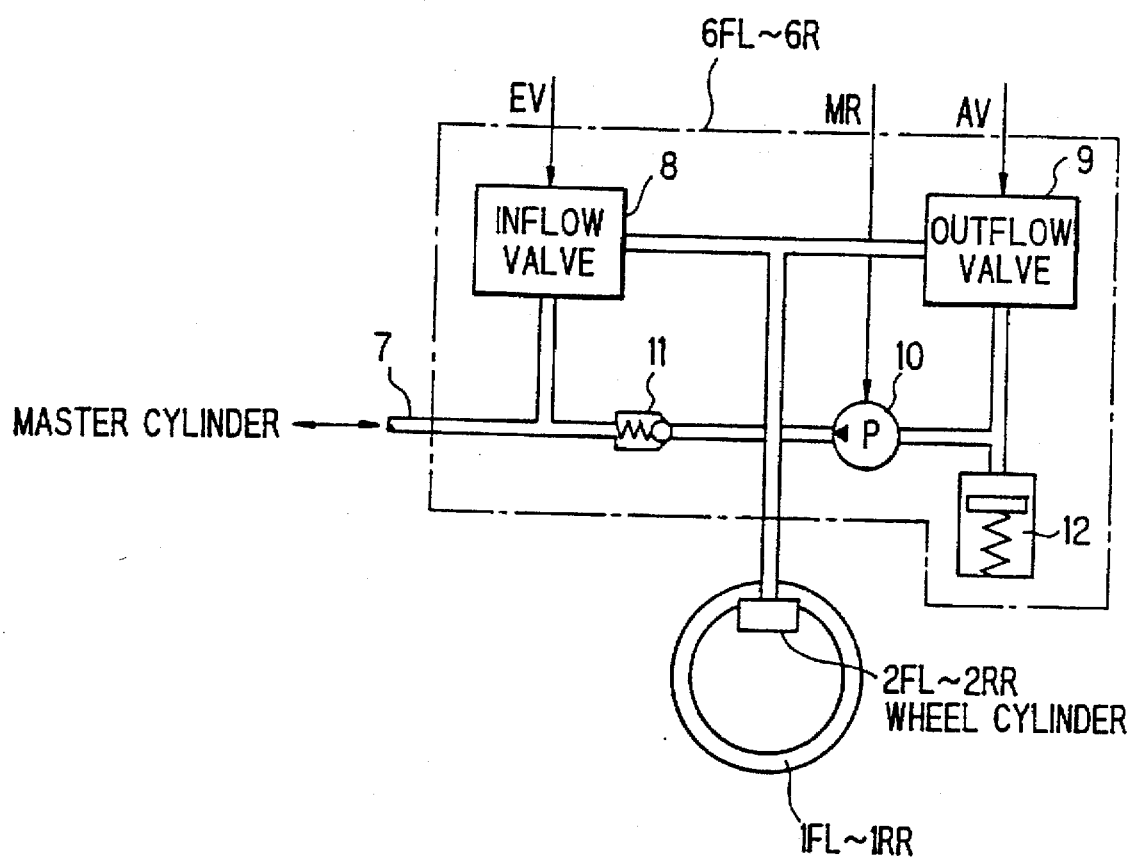
FIG. 2 is a schematic diagram of an actuator according to this invention.

As shown in FIG. 2, the actuators 6R, 6FL and 6FR each comprise an oil pressure pipe 7, electromagnetic inflow valve 8, electromagnetic outflow valve 9, oil pressure pump 10, check valve 11 and accumulator 12.

The oil pressure pipe 7 is connected to the master cylinder 5, and to the wheel cylinder 2FL (2FR, 2RL and 2RR) via the electromagnetic inflow valve 8. The wheel cylinder 2FL (2FR, 2RL and 2RR) is connected to the oil pressure pump 10 and accumulator 12 via the electromagnetic outflow valve 9.

The oil pressure pump 10 operates according to a control signal MR output by a control unit CU. The oil it discharges passes through a check valve 11, and flows into the oil pressure pipe 7 upstream of the electromagnetic valve 8.

The inflow valve 8 and outflow valve 9 open and close according to control signals EV and AV respectively output by the control unit CU, and they control the inflow pressure and outflow of the wheel cylinder 2FL (2FR, 2RL and 2RR).

The control signals MR, EV and AV can each have only the two values 0 and 1. The oil pressure pump operates when M=1, and stops when MF=0. The inflow valve 8 opens when EV=0 and closes when EV=1. The outflow valve 9 opens when AV=1 and closes when AV=0. The wheel cylinder 2FL (2FR, 2RL and 2RR) is therefore pressurized when EV and AV are both 0, and depressurized when EV and AV are both 1. When EV=1 and AV=0, the present pressure is maintained.

The vehicle further comprises a pressure sensor 13F that detects a pressure $P_{MCF}$ supplied to the front wheels and a pressure sensor 13R that detects a pressure/$P_{MCR}$ supplied to the rear wheels from the master cylinder 5. Further provided is a brake switch 14 that outputs a brake switch signal BS corresponding to a depression amount of the brake pedal 4.

The control unit CU comprises an input interface 20a having an A/D conversion function, a microprocessor 20 having an output interface 20d, CPU 20b and memory 20c, wheel speed computing circuits 15FL, 15FR, 15R, wheel speed filters 18FL, 18FR, 18R that process the outputs of these computing circuits, and amplifying circuits 22FL, 22FR, 22R that convert the signals output by the microprocessor 20 into the control signals EV, AV and MR of the actuators 6FL, 6FR, 6R.

The wheel speed computing circuits 15FL, 15FR, 15R compute the wheel speeds $V_{W_{FL}}$, $V_{W_{FR}}$, $V_{W_R}$ from the input pulse signals from the sensors 3FL, 3FR, 3R and the rotation radii of the wheels.

The wheel speed filters 18FL, 18FR, 18R comprise a sample hold circuit 181 that holds a wheel speed $V_{W_i}$ as a sampling value $V_S$, an integrating circuit 182 comprising an operational amplifier that integrates an input voltage E and outputs an integral value $V_e$, an adder circuit 183 that adds the sampling value $V_S$ and integral value $V_e$ so as to output a filter output $V_{f_i}$, an insensitive zone circuit 184, a reset circuit and a selecting circuit 187.

The letter i in the symbols indicates FL, FR, R.

The insensitive zone circuit 184 outputs determining signals $C_1$, $C_2$ that determine whether or not the wheel speed $V_{W_i}$ is within a predetermined insensitive zone relative to the filter output $V_{f_i}$, i.e. whether or not $V_{f_i}-1$ km/h$<V_{W_i}<V_{f_i}+1$ km/h. The determining signals $C_1$, $C_2$ are low level when the wheel speed $V_{W_i}$ is within the insensitive zone. When $V_{f_i}+1$ km/h$\leq V_{W_i}$, the determining signal $C_1$ is high level, and when $V_{W_i} \leq V_{f_i}-1$ km/h, the determining signal $C_2$ is high level.

The reset circuit 185 holds the wheel speed $V_{W_i}$ in the sample hold circuit 181 and outputs a reset signal that resets the integrating circuit 182 when the wheel speed $V_{W_i}$ is within the insensitive zone and an ON signal is input by an ignition switch provided on the vehicle.

The selecting circuit 187 sets the input voltage E to 0 when the wheel speed $V_{W_i}$ is within the insensitive zone and until a predetermined time T has elapsed from when the wheel speed $V_{W_i}$ moves outside the insensitive zone. In the non-antiskid control condition after the predetermined time T has elapsed from when $V_{f_i}+1$ km/h$\leq V_{W_i}$, a negative voltage corresponding to +0.4 G is set equal to the input voltage E. In the antiskid control condition after the predetermined time T3 has elapsed from when $V_{f_i}+1$ km/h$\leq V_{W_i}$, a negative voltage corresponding to +10 G is set equal to the input voltage E. Also, after the predetermined time T has elapsed from when $V_{W_i} \leq V_{f_i}-1$ km/h, a positive voltage corresponding to −1.2 G is set equal to the input voltage E.

The microprocessor 20 outputs a wheel speed slope $V_{XK}$ and an estimated vehicle speed $V_X$ based on the filter output $V_{f_i}$, and computes a target wheel speed $V_W^*$ based on the estimated wheel speed $V_X$. It also differentiates the wheel speeds $V_{W_{FL}}$, $V_{W_{FR}}$, $V_{W_R}$ so as to respectively compute wheel accelerations $V_{W_{FL}}'$, $V_{W_{FR}}'$, $V_{W_R}'$. Based on the wheel speeds $V_{W_{FL}}$, $V_{W_{FR}}$, $V_{W_R}$, the wheel accelerations $V_{W_{FL}}'$, $V_{W_{FR}}'$, $V_{W_R}'$ and the target wheel speed $V_W^*$, target wheel cylinder pressures $P_{FL}^*$, $P_{FR}^*$, $P_R^*$ are computed. Estimated wheel cylinder pressures $P_{FL}$, $P_{FR}$, $P_R$ are also computed based on the master cylinder pressure detection values $P_{MCF}$, $P_{MCR}$, the wheel speed slope $V_X$ and the control signals EV, AV, MR output to the actuators 6R, 6FL, 6FR. Finally, signals $EV_{FL}$, $AV_{FL}$, $MR_{FL}$, $EV_{FR}$, $AV_{FR}$, $MR_{FR}$, $EV_R$, $AV_R$, $MR_R$ are respectively output to the actuators 6FL, 6FR, 6R such that these estimated wheel cylinder pressures $P_{FL}$, $P_{FR}$, $P_R$ and the target wheel cylinder pressures $P_{FL}^*$, $P_{FR}^*$, $P_R^*$ coincide.

The aforesaid process executed by the microprocessor will now be described with reference to the flowcharts of FIGS. 4–8.

First, the main antiskid control routine will be described with reference to FIG. 4, then the subroutines comprising each step will be described. This control is performed at a predetermined interval of, for example, 10 ms.

In a step S1, the supply pressures $P_{MCF}$, $P_{MCR}$ of the master cylinder 5 detected by the pressure sensors 13F, 13R, the wheel speeds $V_{W_{FL}}$, $V_{W_{FR}}$, $V_{W_R}$ output by the wheel speed computing circuits 15FL, 15FR, 15R, and the output values $V_{f_{FL}}$, $V_{f_{FR}}$, $V_{f_R}$ of the wheel speed filters 18FL, 18FR, 18R are read. The wheel speeds $V_{W_{FL}}$, $V_{W_{FR}}$, $V_{W_R}$ are then differentiated to compute the wheel accelerations $V_{W_{FL}}{'}$, $V_{W_{FR}}{'}$, $V_{W_R}{'}$. These values are stored in a predetermined storage region of the memory 20c. This storage operation is performed by updating the preceding stored values.

Figure 5:
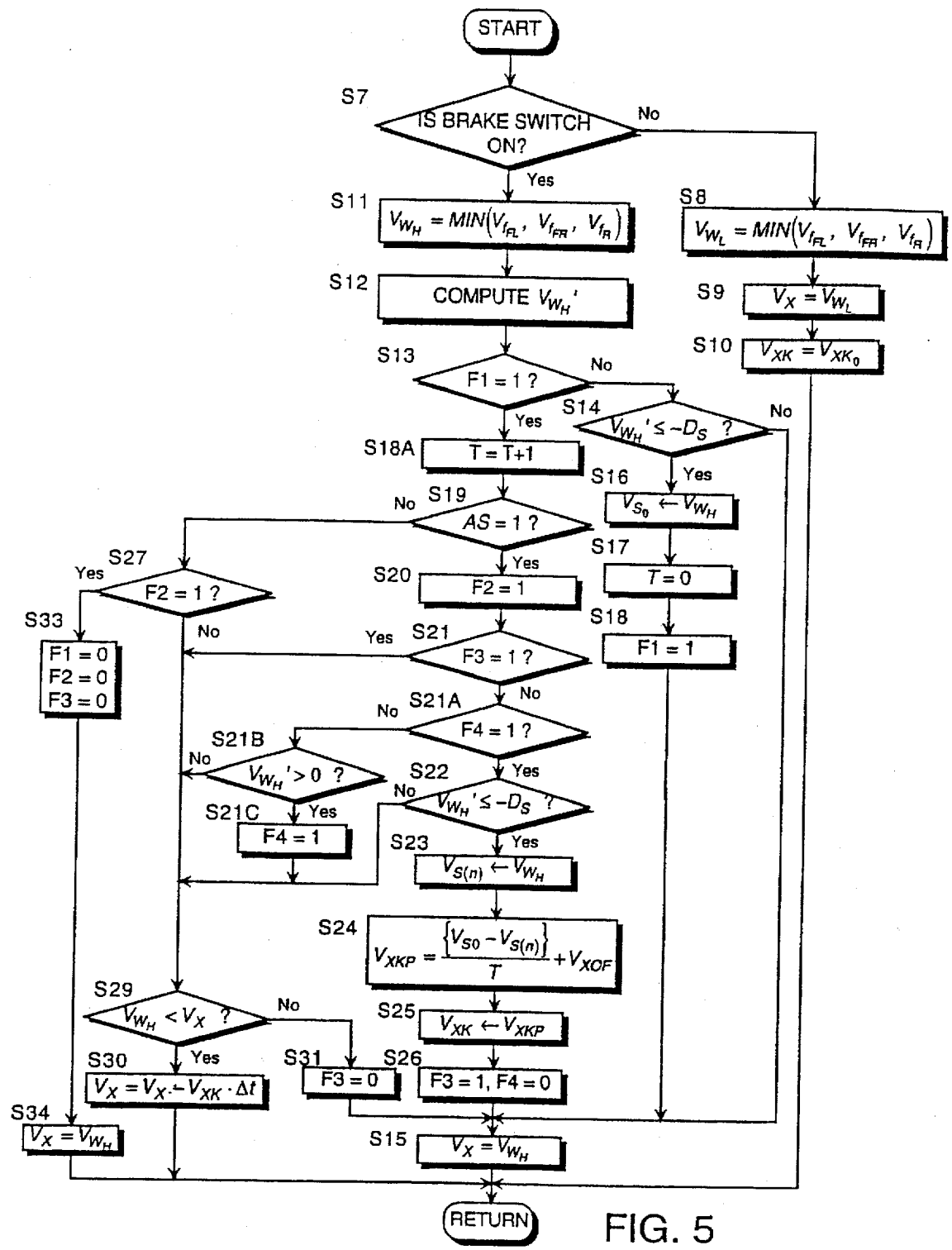
FIG. 5 is a flowchart describing a routine for computing an estimated vehicle speed $V_X$ according to this invention.

In a step S2, the wheel speed slope $V_{XK}$ and estimated vehicle speed $V_X$ are computed according to the process shown by the flowchart of FIG. 5 from the filter outputs $V_{f_{FL}}$, $V_{f_{FR}}$, $V_{f_R}$.

Figure 6:
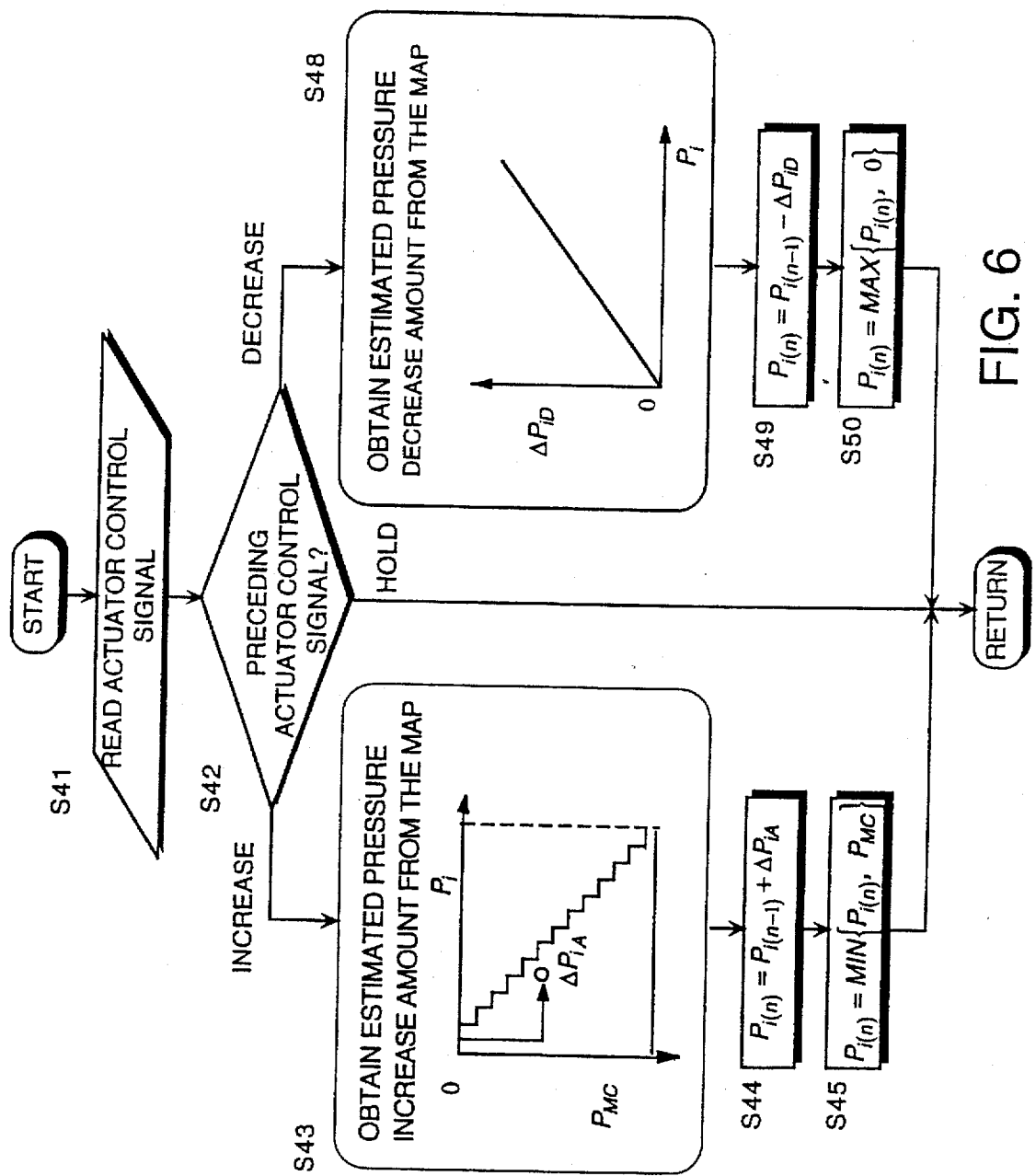
FIG. 6 is a flowchart describing a routine for estimating a wheel cylinder pressure according to this invention.

In a step S3, the present estimated wheel cylinder pressure $P_{FL}$, $P_{FR}$, $P_R$ are computed according to the process shown by the flowchart in FIG. 6 based on the master cylinder pressures $P_{MCF}$, $P_{MCR}$, and the immediately preceding control signals $EV_{FL}$, $AV_{FL}$, $MR_{FL}$, $EV_{FR}$, $AV_{FR}$, $MR_{FR}$, $EV_R$, $AV_R$, $MR_R$.

In a step S4, the computation of the equation (1) below is performed, the target wheel speed $V_W^*$ is computed, and this is stored in a target wheel speed storage region set in the memory 20c. This storage is performed by updating the preceding stored values.

$$V_{W_0}^* = 0.8 \cdot V_X \quad (1)$$

where, $V_{W_0}^*$ is the target wheel decceleration and
$V_X$ is the estimated vehicle speed.

In a step S4A, it is determined whether or not the target wheel speed $V_W^*$ is less than the wheel speed $V_{W_i}$. When $V_W^* < V_{W_i}$, a target wheel deceleration $V_W^{*'}$ is set to 0 in a step S4B, and this is stored in a target wheel deceleration storage region of the memory 20c. This storage also is performed by updating the preceding stored values. When $V_W^* \geq V_{W_i}$ in a step S4C, the target wheel deceleration $V_W^{*'}$ is computed by equation (2) below. The deceleration is expressed as a negative value, an increase of deceleration meaning that the absolute value of the deceleration increases.

$$V_W^{*'} = -V_{W_0}{'} \quad (2)$$

where, $V_W^{*'}$ is the target wheel speed and
$V_{W_0}{'}$ is a set value.

Figure 7:
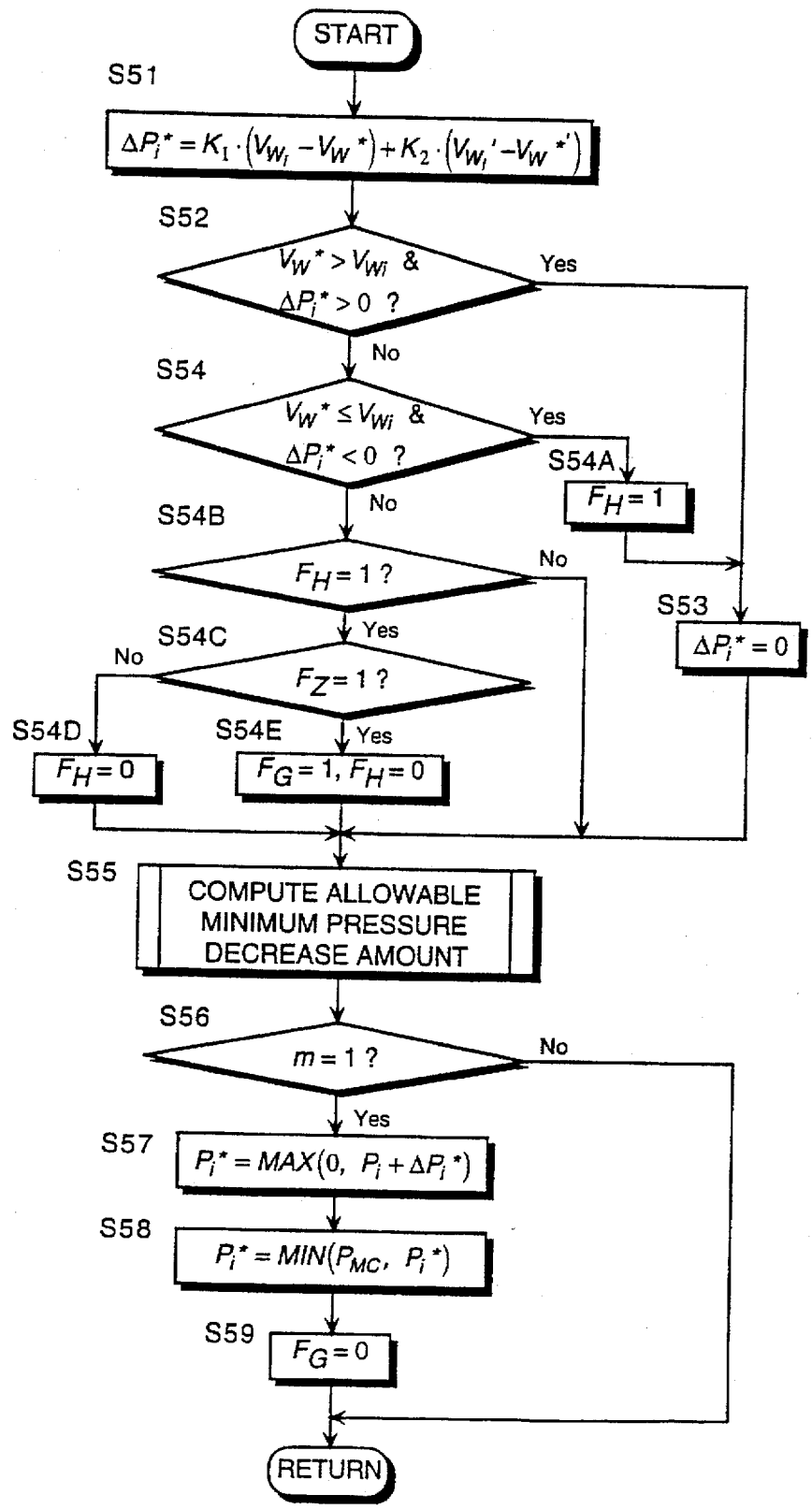
FIG. 7 is a flowchart describing a routine for computing a target wheel cylinder pressure according to this invention.

Next, in a step S5, the target wheel cylinder pressures $P_{FL}^*$, $P_{FR}^*$, $P_R^*$ are computed by the process shown by the flowchart of FIG. 7.

Figure 8:
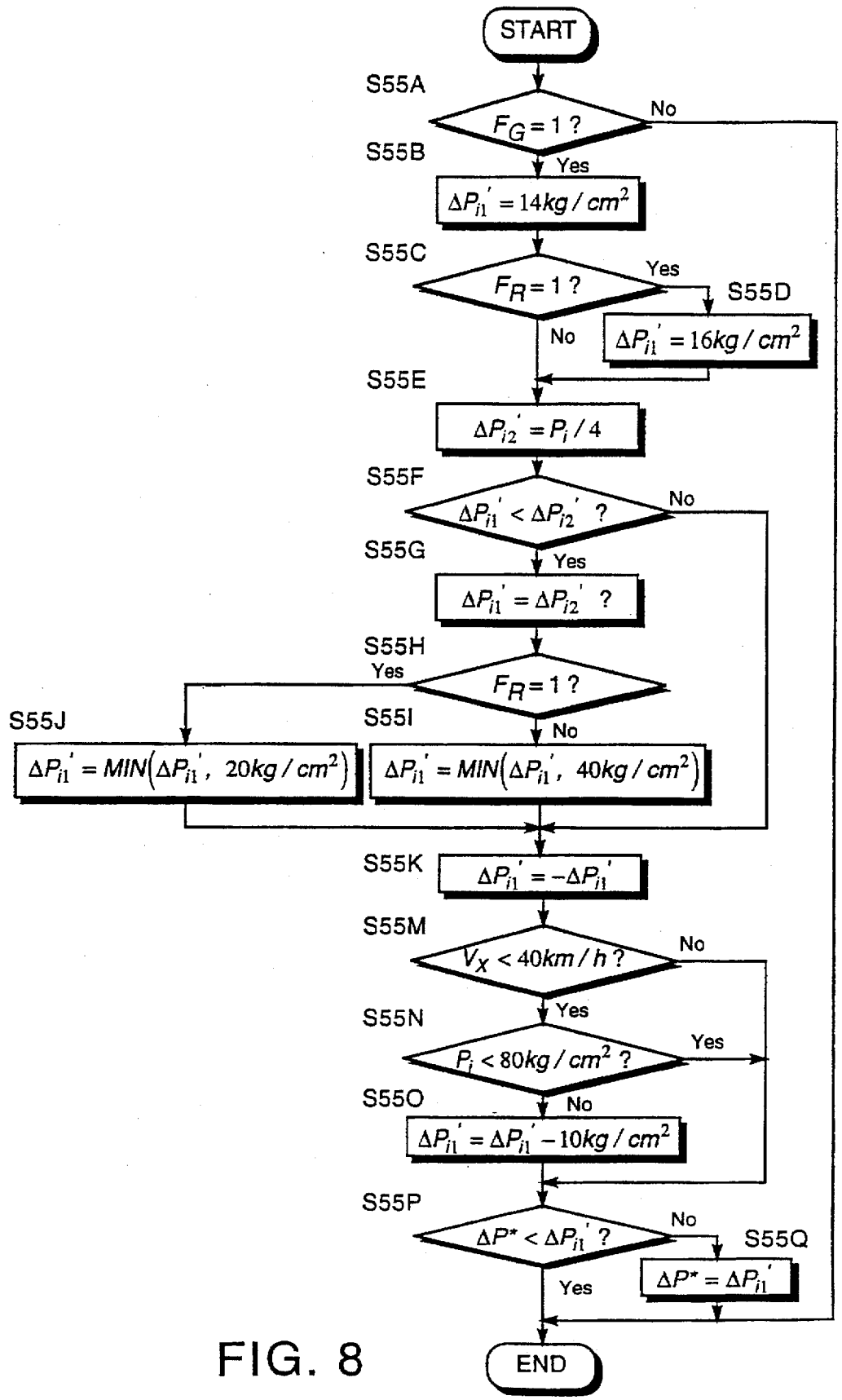
FIG. 8 is a flowchart describing a routine for computing a minimum pressure decrease amount according to this invention.

Finally, in a step S6, control signals EV, AV, MR are determined, by the actuator control process shown by the flowchart of FIG. 8, according to the differences between the present estimated wheel cylinder pressures $P_{FL}$, $P_{FR}$, $P_R$ and target wheel cylinder pressures $P_{FL}^*$, $P_{FR}^*$, $P_R^*$. After outputting these signals, the routine is terminated.

The computation of the estimated vehicle speed $V_X$ performed in the step S2 uses the subroutine shown in the flowchart of FIG. 5. In this subroutine, it is first determined in a step S7 whether or not the brake switch signal BS is OFF.

When the brake switch signal BS is OFF, i.e. when the control operation is not taking place, the smallest value of the later outputs $V_{f_{FL}}$, $V_{f_{FR}}$, $V_{f_R}$ is selected as a select-low wheel speed $V_{W_L}$ in a step S8 by equation (3) below.

$$V_X = \text{MIN}(V_{f_{FL}}, V_{f_{FR}}, V_{f_R}) \quad (3)$$

where, $V_{f_{FL}}$ is filter output value of left front wheel,
$V_{f_{FR}}$ is filter output value of right front wheel, and
$V_{f_R}$ is filter output value of rear wheel.

Next, in a step S9, the select-low wheel speed $V_{W_L}$ is stored as the estimated vehicle speed $V_X$ in a predetermined region of the memory 20c. In a step S10, the vehicle speed slope $V_{XK}$ is set to a preset predetermined value $V_{XK_0}$, and stored in an estimated vehicle speed storage region of the memory 20c. These storage operations are performed by updating the preceding stored values. After the aforesaid processing, the routine is terminated.

When on the other hand the brake switch signal BS is ON, i.e. when the control operation is taking place, the maximum value of the filter outputs $V_{f_{FL}}$, $V_{f_{FR}}$, $V_{f_R}$ is selected as a select-high wheel speed $V_{W_H}$ by equation (4) below in a step S11, and stored in the memory 20c. This storage operation takes place by updating the preceding stored values.

$$V_X = \text{MAX}(V_{f_{FL}}, V_{f_{FR}}, V_{f_R}) \quad (4)$$

In a step S12, the select-high wheel speed $V_{W_H}$ is differentiated to compute a vehicle deceleration $V_{W_H}{'}$.

Next, in a step S13, a determination of a flag F1 showing whether or not this vehicle deceleration $V_{W_H}{'}$ exceeds a set deceleration $-D_S$. When F1=0, it is determined that the vehicle is not in a braking condition and the routine proceeds to a step S14.

In the step S14, the vehicle deceleration $V_{W_H}{'}$ is compared with the set deceleration $-D_S$. When $V_{W_H}{'} > -D_S$, it is determined that the vehicle is in a braking condition, the select-high wheel speed $V_{W_H}$ is stored as an estimated vehicle speed $V_X$ in a predetermined region of the memory 20c in a step S15, and the subroutine is terminated. This storage operation also is performed by updating stored values.

When $V_{W_H}{'} \leq -D_S$ in the step S14, the routine proceeds to a step S16. In the step S16, the select-high wheel speed $V_{W_H}$ is stored as a present sampling wheel speed $V_{S_0}$ in a present value storage region of the memory 20c. This storage operation also is performed by updating the preceding values.

Next, in a step S17, a timer value that counts the elapsed time T is cleared, and after a flag F1 showing whether or not the wheel deceleration has exceeded a predetermined value, is set to 1 in a step S18 meaning that it has exceeded this value, the routine proceeds to the aforesaid step S15.

On the other hand, when the flag F1 showing that the wheel deceleration has exceeded the predetermined value is 1 in the aforesaid step S13, the timer value T is incremented by 1 in a step S18A, and it is determined in a step S19 whether or not an antiskid control flag AS is set to 1. This antiskid control flag AS is set in an antiskid control process described hereinafter, the value AS=1 showing that the wheel cylinder pressure is decreasing.

When AS=1, the flag F2 is set to 1 in a step S20. The flag F2 is a flag showing whether or not the antiskid control has begun. Next, in a step S21, it is determined whether or not a flag F3 is 1. The flag F3 is a flag showing whether or not the select-high wheel speed $V_{W_H}$ has decreased to less than the estimated vehicle speed $V_X$ stored on the immediately preceding occasion.

When F3=1, it is determined whether or not F4 is 1 in a step S21A. The flag F4 is a flag showing whether or not the select-high wheel speed $V_{W_H}$ is increasing or decreasing. F4=1 means that the select-high wheel speed $V_{W_H}$ is increasing. When F3=0, the routine proceeds to a step S29.

When F4=0, it is determined in a step S21B whether or not the wheel deceleration $V_{W_H}'$ is positive, and when the wheel deceleration $V_{W_H}' \leq 0$, the routine proceeds to the step S29 described hereinafter. When the wheel deceleration $V_{W_H}' > 0$, the flag F4 is set to 1 in a step S21C and the routine proceeds to the step S29.

When F4=1 in the step S21A, the wheel deceleration $V_{W_H}'$ is compared with the set deceleration $-D_S$ in a step S22 as in the step S14. When $V_{W_H}' > -D_S$, the routine proceeds to a step S29, and when $V_{W_H}' \leq -D_S$, the routine proceeds to a step S23. In the step S23, the present select-high wheel speed $V_{W_H}$ is stored as a present sampling wheel speed $V_{S(n)}$ in the present value storage region of the memory 20c, and the routine proceeds to a step S24.

In the step S24, the vehicle speed slope $V_{XKP}$ is calculated from the equation below.

$$V_{XKP} = \frac{\{V_{S0} - V_{S(n)}\}}{T} + V_{XOF} \quad (5)$$

where,

T is the time elapsed from the immediately preceding sampling and $V_{XOF}$ is an offset value.

Next, the vehicle speed slope $V_{XKP}$ is stored as $V_{XK}$ in a step S25, the flag F3 is set to 1 and the flag F4 showing whether or not the vehicle deceleration is positive is set to 0 in a step S26, and the routine proceeds to the aforesaid step S15.

When the flag AS showing whether or not the vehicle is under antiskid control is 0 in the determination of the step S19, it is determined in a step S27 whether or not the flag F2 showing whether or not antiskid control has begun, is 1. When the flag F2=0, antiskid control has not yet begun and the routine proceeds to the step S29.

In the step S29, it is determined whether or not the select-high wheel speed $V_{W_H}$ is less than the estimated vehicle speed $V_X$. When $V_{W_H} < V_X$, in a step S30, a value obtained by multiplying the required sampling time $\Delta t$ by the vehicle speed slope $V_{XK}$ stored in the memory 20c, is subtracted from the estimated vehicle speed $V_X$, and the value obtained updates the value stored in the memory as the estimated vehicle speed $V_X$.

When $V_{W_H} \geq V_X$, the flag F3 showing the deceleration state of the vehicle is set to 0 in a step S31, and the routine proceeds to the step S15.

When F2=1 in the determination of the aforesaid step S27, the flags F1, F2, F3 and F4 are all reset to 0 in a step S33, the present select-high wheel speed $V_{W_H}$ is set as the estimated vehicle speed $V_X$ in a step S34, and the process of computing the estimated vehicle speed $V_X$ is terminated.

Using the estimated vehicle speed $V_X$ obtained by the process described hereinabove, a computation of the present estimated pressures $P_{FL}$, $P_{FR}$, $P_R$ of the wheel cylinders is performed in the step S3 of FIG. 4.

This subroutine will be described with reference to the flowchart of FIG. 6.

First, the control signals EV, AV, MR which were output on the immediately preceding occasion are read in a step S41, and it is determined in a step S42 from the read control signals whether the wheel cylinders 2FL, 2FR, 2RL, 2RR are in an increasing pressure, decreasing pressure or hold state.

When the pressure is increasing, in a step S43, an estimated wheel cylinder pressure $P_{i(n-1)}$ on the immediately preceding occasion is read from the memory 20c, and an estimated pressure increase amount $\Delta P_{iA}$ is found by referring to a map of estimated pressure increase amounts prestored in the memory 20c based on $P_{i(n-1)}$ and the master cylinder pressure $P_{MC}$ on the present occasion.

When the master cylinder pressure $P_{MC}$ is constant, the map of estimated pressure increase amount is set so that the estimated pressure increase amount $\Delta P_{iA}$ increases the larger the wheel cylinder pressure $P_{i(n-1)}$ on the immediately preceding occasion, and so that the estimated pressure increase amount $\Delta P_{iA}$ increases the larger the master cylinder pressure $P_{MC}$.

In a step S44, the estimated wheel cylinder pressure $P_{i(n)}$ on the present occasion is computed from the equation (6) below.

$$P_{i(n)} = P_{i(n-1)} + \Delta P_{iA} \quad (6)$$

Next, in a step S45, the computed estimated wheel cylinder pressure $P_{i(n)}$ is compared with the present master cylinder pressure $P_{MC}$ by equation (7) below, and the value stored in the memory 20c is updated by putting the lesser of the two values equal to the wheel cylinder pressure $P_{i(n)}$ on the present occasion.

$$P_{i(n)} = \text{MIN}\{P_{i(n)}, P_{MC}\} \quad (7)$$

Also, when the determination result of the step S42 is the hold state, this subroutine is terminated at this point.

When the determination result of a step 42C is the decreasing pressure state, the estimated wheel cylinder pressure $P_{i(n-1)}$ on the immediately preceding occasion which is stored in the memory 20c is read in a step S48, and an estimated pressure decrease amount $\Delta P_{iD}$ is found by referring to a map of estimated pressure decrease amount prestored in the memory 20c based on this value. The map of estimated pressure decrease amount is set so that the estimated pressure decrease amount $\Delta P_{iD}$ also increases the larger the estimated wheel cylinder pressure $P_{i(n-1)}$ on the immediately preceding occasion.

The estimated wheel cylinder pressure $P_{i(n)}$ on the present occasion is computed by equation (8) below in a step S49.

$$P_{i(n)} = P_{i(n-1)} - \Delta P_{iD} \quad (8)$$

Next, using the following equation (9) in a step S50, the value stored in the memory 20c is updated by taking the value of the estimated wheel cylinder pressure $P_{i(n)}$ on the present occasion or 0, whichever is the larger.

$$P_i(n) = \text{MAX}\{P_i(n), 0\} \quad (9)$$

The computation of the target wheel cylinder pressure performed in the step S5, is performed by the subroutine shown by the flowchart of FIG. 7.

In this subroutine, a target pressure increase/decrease amount $\Delta P_i^*$ of proportional differential control (PD control) is computed by equation (10) below using the wheel speed $V_{W_i}$ and the target wheel speed $V_W^*$, wheel deceleration $V_{W_i}'$ and target wheel deceleration $V_W^{*'}$ calculated in the steps S4–S4C.

$$\Delta P_i = K_1 \cdot (V_{W_i} - V_W^*) + K_2 \cdot (V_{W_i}' - V_W^{*'}) \quad (10)$$

where, $K_1$ is the proportional gain and $K_2$ is the differential gain.

In this equation, the first term on the right-hand side is a proportional control term, and the second term on the right-hand side is a differential control term.

After this calculation, it is determined in a step S52 whether or not the target wheel speed $V_W^*$ is greater than the wheel speed $V_{W_i}$, and whether or not the target pressure increase/decrease amount $\Delta P_i^*$ is positive. When this condition holds, the target pressure/increase amount $\Delta P_i^*$ is set to 0 in a step S53, and the routine proceeds to a step S55. When this condition does not hold, it is determined in a step S54 whether or not the target wheel speed $V_W^*$ is equal to or less than the wheel speed $V_{W_i}$, and whether or not the target pressure increase/decrease amount $\Delta P_i^*$ is negative. When this condition holds, a flag $F_H$ indicating the hold state after pressure increase is set equal to 1 in a step S54A, the target pressure increase/decrease amount $\Delta P_i^*$ is set equal to 0 in the step S53, and the routine proceeds to the step S55.

The fact that the determination results of both of the steps S52, S53 is affirmative, means that the conditions are such that the wheel cylinder pressure should be maintained as it is. When either of these determination results is negative, it means that the wheel cylinder pressure should either be reduced or increased.

In the latter case, it is determined in a step S54B whether the flag $F_H$ indicating the hold state is 1, and if $F_H = 0$ the routine proceeds directly to the step S55. When $F_H = 1$, it is determined in a step S54C whether or not a flag $F_Z$ indicating the slow pressure increase state is set to 1. When $F_Z = 1$, it is determined that the pressure reduction is the first pressure reduction after slow pressure increase, a flag $F_G$ indicating pressure reduction is set to 1 in a step S54E, the flag $F_H$ is reset to 0 and the routine proceeds to the step S55.

In the step S55, an allowable minimum pressure decrease amount $\Delta P_i'$ is computed according to the routine of FIG. 8 based on the estimated wheel cylinder pressure $P_i$.

In the routine of FIG. 8, it is determined in a step S55A whether or not the pressure reduction flag $F_G$ is set to 1. When this flag is 0 the subroutine is terminated, and the routine proceeds to a step S56 and subsequent steps in FIG. 7. When the pressure reduction flag $F_G$ is 1, a predetermined value for the front wheels, for example 14 kg/cm², is set as a first allowable minimum pressure decrease amount $\Delta P_{i1}'$ in a step S55B, this value is stored in a predetermined area of the memory 20c, and the routine proceeds to a step S55C.

In the step S55C, it is determined whether or not a flag $F_R$ indicating rear wheel braking control is set to 1, and when it is 0, the routine proceeds to a step S55E. When it is 1, a predetermined value for the rear wheels, for example 16 kg/cm², is set as a first allowable minimum pressure decrease amount $\Delta P_{i1}'$ in a step S55D, this value is stored in a predetermined area of the memory 20c, and the routine proceeds to the step S55E.

In the step S55E, a second allowable minimum pressure decrease amount $\Delta P_{i2}'$ is computed by the following relation (11) based on the estimated wheel cylinder pressure $P_i$.

$$\Delta P_{i2}' = \frac{P_i}{4} \quad (11)$$

Next, in a step S55F, it is determined whether or not the first allowable minimum pressure decrease amount $\Delta P_{i1}'$ is less than the second allowable minimum pressure decrease amount $\Delta P_{i2}'$. When $\Delta P_{i1}' < \Delta P_{i2}'$, the routine proceeds to a step S55K, otherwise the second allowable minimum pressure decrease amount $\Delta P_{i2}'$ is stored in the memory 20c as the first allowable minimum pressure decrease amount $\Delta P_{i1}'$ in a step S55G, and the routine proceeds to a step S55H.

In the step S55H, it is determined whether or not the rear wheel control flag $F_R$ is set to 1 as in the step S55C. When it is 0, it is determined that front wheel braking control is being performed, and the first allowable minimum pressure decrease amount $\Delta P_{i1}'$ is calculated by the equation (12) below in a step S55I, and the routine proceeds to a step S55K.

When the rear wheel control flag $F_R$ is set to 1, the first allowable minimum pressure decrease amount $\Delta P_{i1}'$ is calculated by the equation (13) below in a step S55J, and after this value is stored in the memory 20c, the routine proceeds to the step S55K.

$$\Delta P_{i1}' = \text{MAX}(\Delta P_{i1}', 40 \text{ kg/cm}^2) \quad (12)$$

$$\Delta P_{i1}' = \text{MAX}(\Delta P_{i1}', 20 \text{ kg/cm}^2) \quad (13)$$

In the step S55K, $-\Delta P_{i1}'$ is used as the first allowable minimum pressure decrease amount $\Delta P_{i1}'$, and in a step S55M it is determined whether or not the estimated vehicle speed $V_X$ is a set value, for example less than 40 km/h. This condition determines whether the vehicle is traveling at low speed, and if the speed is 40 km/h or more, it is determined that the vehicle is traveling at high speed and the routine proceeds to a step S55P. When the speed is less than 40 km/h, it is determined that the vehicle is traveling at low speed, and the routine proceeds to a step S55N. In the step S55N, it is determined whether or not the estimated wheel cylinder pressure $P_i$ is less than a set value, e.g. 80 kg/cm². When $P_i < 80$ kg/cm², the routine proceeds to the step S55, and when $P_i \geq 80$ kg/cm², it is determined that the vehicle is traveling at low speed on a road with a high frictional coefficient where the wheel cylinder pressure is high, and the routine proceeds to a step S55O. Here, a value obtained by subtracting a predetermined offset amount, e.g. 10 kg/cm², from the first allowable pressure decrease amount $\Delta P_{i1}'$, is stored in the memory 20c as a new first allowable minimum pressure decrease amount $\Delta P_{i1}'$, and the routine proceeds to the step S55P.

In the step S55P, it is determined whether or not a target pressure increase/decrease amount $\Delta P_i^*$ stored in the memory 20c, is less than the first allowable minimum pressure decrease amount $\Delta P_{i1}'$. This determination selects the larger of the absolute values of the pressure decrease amounts. When $\Delta P_i^* < \Delta P_{i1}'$, the subroutine is terminated without modification, otherwise when $\Delta P_i^* \geq \Delta P_{i1}'$, the first allowable minimum pressure decrease amount $\Delta P_{i1}'$ is stored in the memory 20c as the target pressure increase/decrease amount $\Delta P_i^*$ and the routine is then terminated.

Now, referring back to FIG. 7, in a step S56, it is determined whether or not a slow pressure increase/decrease period m for correcting the difference between a target wheel cylinder pressure $P_i^*$ and estimated wheel cylinder pressure $P_i$, is 1. This slow pressure increase/decrease period m is set in an actuator control process described hereinafter. When m is not 1, the routine is terminated.

When m=1, the target pressure increase/decrease $P_i^*$ is computed in a step S57 by the equation below (14). The smaller of a master cylinder pressure $P_{MC}$ and this target wheel cylinder pressure $P_i^*$ is then determined as the target wheel cylinder pressure $P_i^*$ in a step S58 by the equation (15) below, and stored in the memory 20c. Next, in a step S59, the pressure reduction flag $F_G$ is reset to 0 and the subroutine is terminated.

$$P_i^* = \text{MAX}(0, P_i + \Delta P_i^*) \qquad (14)$$

$$P_i^* = \text{MIN}(P_{MC}, P_i^*) \qquad (15)$$

Figure 9:
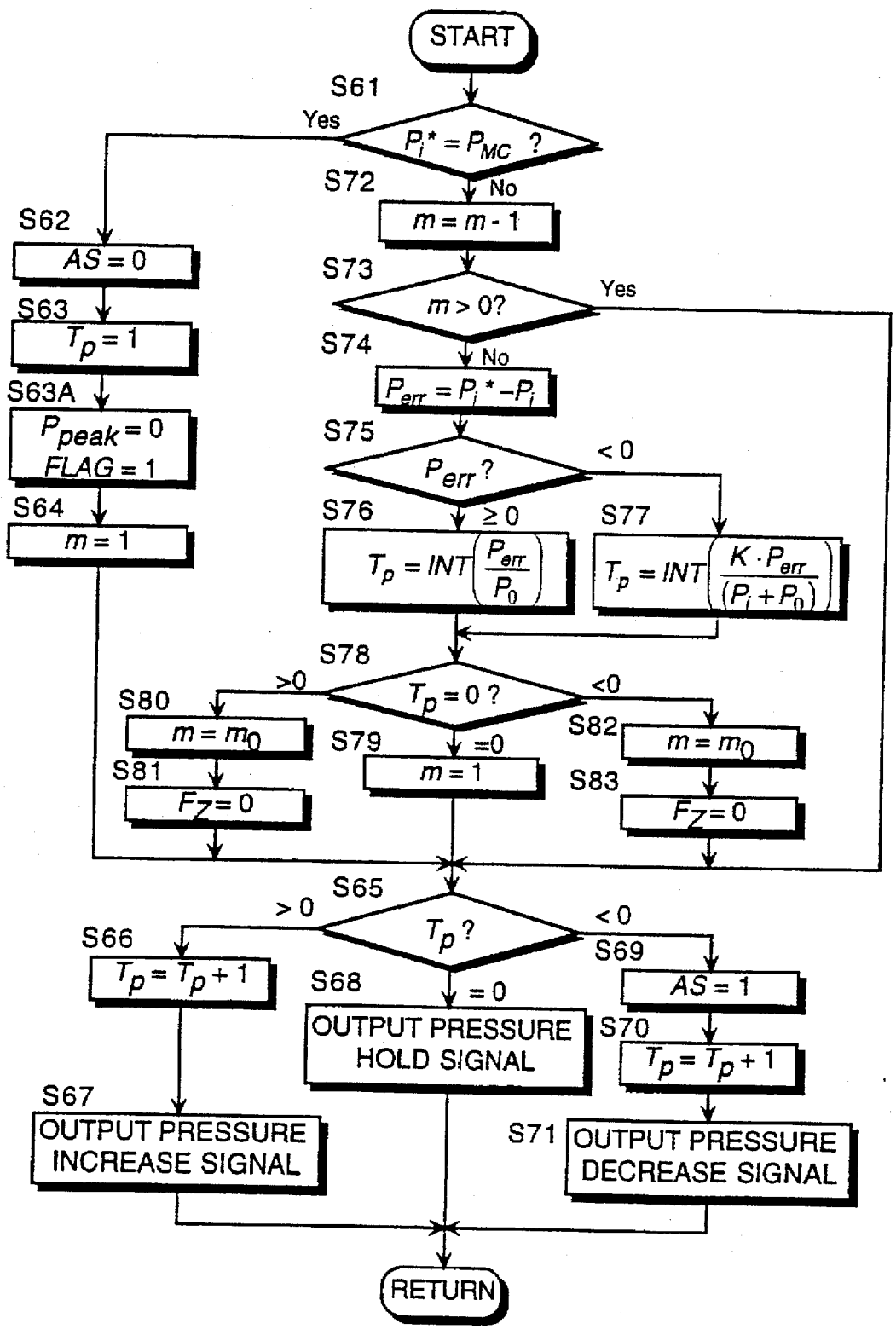
FIG. 9 is a flowchart describing an actuator control routine according to this invention.

The determination of the actuator control signals EV, AV, MR in the step S6 is performed according to a subroutine shown in the flowchart of FIG. 9.

In the step S61, it is determined whether or not the target wheel cylinder pressure $P_i^*$ calculated in the step S5 is equal to the master cylinder pressure $P_{MC}$. When these two values are equal, the antiskid control start flag AS is reset to 0 in a step S62, and a pressure increase/decrease time $T_p$ is set to 1 in a step S63. This pressure increase/decrease time $T_p$ shows a control signal output hold time, meaning that during this time, the same control signal continues to be output. A positive $T_p$ indicates a pressure increase hold time, and a negative $T_p$ indicates a pressure decrease hold time.

Next, the routine proceeds to a step S64, the slow pressure increase/decrease period m which is the period of monitoring the difference between the target wheel cylinder pressure $P_{FL}^*$ and the present estimated wheel cylinder pressure $P_{FL}$ is set to 1, and the routine proceeds to a step S65.

In the step S65, it is determined whether or not the pressure increase/decrease time $T_p$ is positive, 0 or negative. When $T_p$>0, the pressure increase/decrease time $T_p$ stored in the memory 20c is updated by a new value obtained by subtracting 1 from it in a step S66. The routine then proceeds to a step S67, and a pressure increase signal at which EV, AV, MR are all 0 is output, and the subroutine is terminated.

In the determination of the step S65, when $T_p$=0, EV=1, AV=0, MR=0 hold signals are output in a step S68 and the subroutine is terminated.

In the determination of the step S65, when $T_p$<0, the antiskid control flag AS is set to 1 in a step S69, and the pressure increase/decrease time $T_p$ is incremented by 1 in a step S70. A pressure decrease signal at which EV, AV, MR are all 1 is then output in a step S71.

In the determination of the aforesaid step S61, when $P_{FL}^*$ is not equal to $P_{MC}$, the routine proceeds to a step S72. Here, a value obtained by subtracting 1 from the slow pressure increase/decrease period m is stored in the memory 20c as a new slow pressure increase/decrease period m. Then in a step S73, it is determined whether or not this slow pressure increase/decrease period m is positive. When m>0, the routine proceeds directly to the preceding step S65, and when m≦0, the routine proceeds to a step S74.

In the step S74, a difference between the target wheel cylinder pressure $P_i^*$ and the estimated wheel cylinder pressure $P_i$, $P_{err}=P_i^*-P_i$ is computed, and in a step S75, it is determined whether or not $P_{err}$ is larger than 0. When $P_{err} \geq 0$, the pressure increase/decrease time $T_p$ is computed by equation (16) below in a step S76, and the routine proceeds to a step S78.

$$T_P = \text{INT}\left(\frac{P_{err}}{P_0}\right) \qquad (16)$$

where, $P_0$=reference value.

When $P_{err}$<0 in the step S75, the pressure increase/decrease time $T_p$ is computed by equation (17) below in a step S77, and the routine proceeds to a step S78.

$$T_p = \text{INT}\left\{\frac{K \cdot P_{err}}{(P_i + P_0)}\right\} \qquad (17)$$

where, K is a constant.

In the step S78, it is determined whether or not the pressure increase/decrease time $T_p$ is 0, and when $T_p$=0, in a step S79, the slow pressure increase/decrease period m is set to 1, the value stored in the memory 20c is updated and the routine proceeds to the step S65. When $T_p$>0, in a step S80, the slow pressure increase/decrease period m is set to a predetermined value $m_0$ and the value stored in the memory 20c is updated. In a step S81, the flag $F_Z$ indicating slow pressure increase is set to 1, and the routine proceeds to the step S65. When $T_p$<0, in a step S82, the slow pressure increase/decrease period m is set to the predetermined value $m_0$, and the value stored in the memory 20c is updated. In a step S83, the flag $F_Z$ indicating slow pressure increase is set to 0, and the routine proceeds to the step S65.

Next, the aforesaid process will be described with reference to specific examples. First, the case will be described when the vehicle is travelling steadily in the non-braking condition at low speed on a road having a high frictional coefficient such as a surfaced road. In this case, as the brake switch 14 is OFF, when the routine for estimating the vehicle speed $V_X$ of FIG. 5 is executed, the processing of the step S7 to the steps S8–S10 is performed. The minimum value of the filter outputs $V_{f_{FL}}$, $V_{f_{FR}}$, $V_{f_R}$ of the wheel speeds $V_{W_{FL}}$, $V_{W_{FR}}$, $V_{W_R}$ is therefore selected as the select-low wheel speed $V_{W_L}$, and is stored as the estimated wheel speed $V_X$ in the memory 20c. Also, the vehicle speed slope $V_{XK}$ is stored as a predetermined value $V_{XK_0}$ in the memory 20c.

By setting the select-low wheel speed $V_{W_L}$ equal to the estimated wheel speed $V_X$, the filter output which is the smaller of the wheel speeds $V_{f_{FL}}$ and $V_{f_{FR}}$ of the front wheels 1FL, 1FR (which are not drive wheels) corresponding to the vehicle speed, is selected as the estimated vehicle speed $V_X$ even when the rear wheels (which are drive wheels) slip so that the wheel speed $V_{W_R}$ has increased. A precise vehicle speed that is not subject to the effect of slip of the drive wheels, can therefore be estimated.

In the wheel cylinder pressure estimating routine of FIG. 6, as the vehicle is in the non-braking condition, control signals $EV_i$, $AV_i$, $MR_i$ are all 0, and the processing from the step S42 to the step S46 is performed. Here, as the vehicle is in the low speed running condition, the estimated wheel cylinder pressure $P_{i(n-1)}$ on the immediately preceding occasion is 0, and as the brake pedal is not depressed, the master cylinder pressures $P_{MCF}$, $P_{MCR}$ on the present occasion are also 0. The estimated pressure increase amount $\Delta P_{iA}$ is therefore 0, and the present estimated wheel cylinder pressure $P_{i(n)}$ is also 0.

Figure 4:
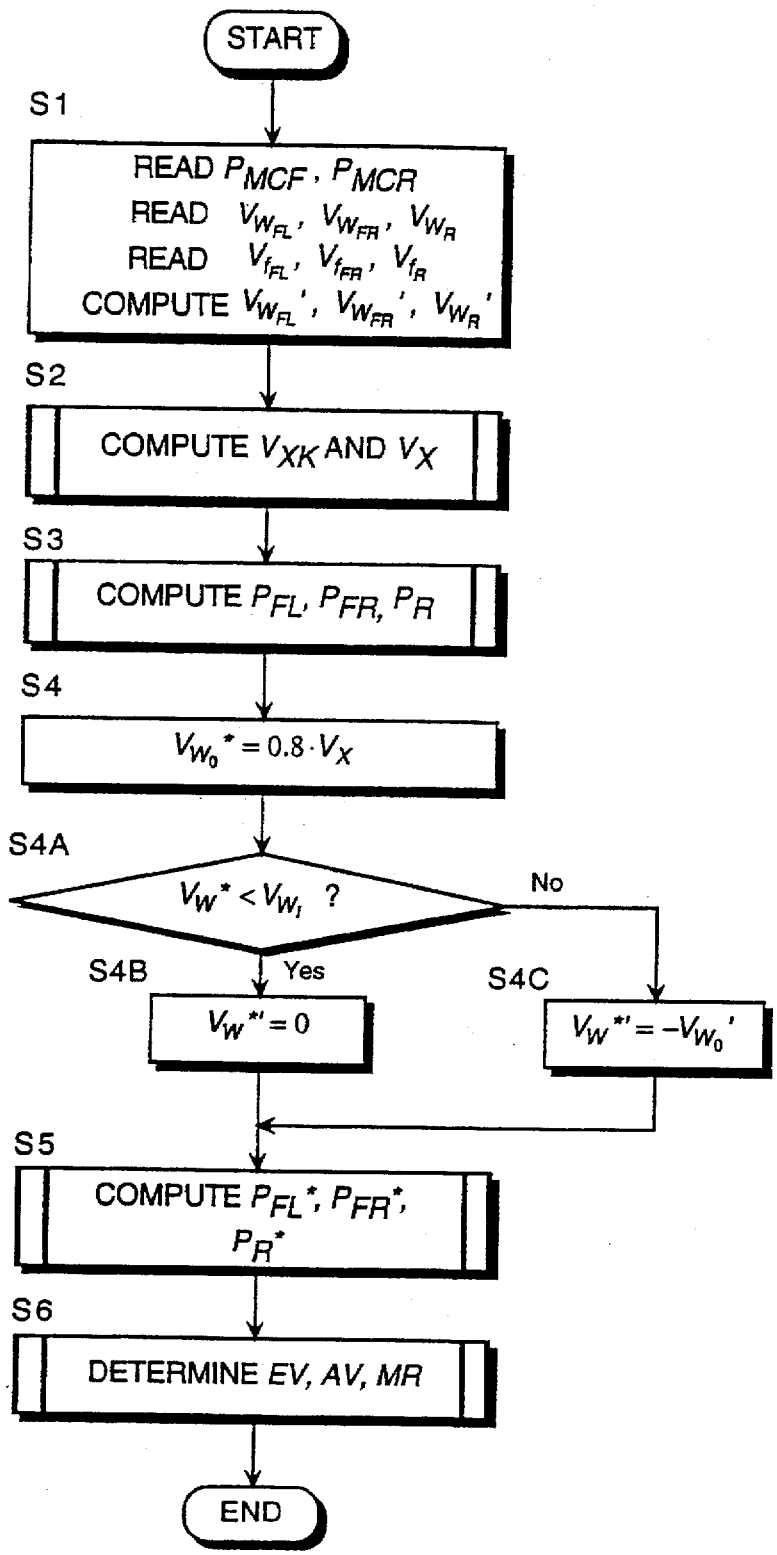
FIG. 4 is a flowchart describing an antiskid control process according to this invention.

Further, as the target wheel speed $V_W^*$ computed in the step S4 of FIG. 4 is 80% of the estimated vehicle speed $V_X$ as shown in FIG. 10(a), it is less than the select-low wheel speed $V_{W_L}$. Processing therefore proceeds from the step S4A to the step S4C, and the target wheel deceleration $V_W^{*'}$ is set to a predetermined value $-V_{W_0}'$ as shown in FIG. 10(b).

As a result, $V_W^* \leq V_{W_i}$, the wheel deceleration $V_{W_i}'$ is 0 and the target wheel deceleration $V_W^*$ is a negative predetermined value $-V_{W_0}'$. Hence, the target pressure increase/decrease $\Delta P_i^*$ in the calculation of equation (10), performed in the step S51 of the flowchart of the target wheel cylinder pressure computation of FIG. 7, is a positive value. This is also shown in FIG. 10(c).

As $V_W^* \leq V_{W_i}$ and $\Delta P_i^*$ is a positive value, the determination result of the step S54 is non-affirmative, and the routine proceeds to the step S54B. Here, the flag $F_H$ indicating the hold state is 0, so the routine proceeds to the step S55. At this point the routine for computing the allowable minimum pressure decrease amount of FIG. 8 is executed, but as the pressure reduction flag $F_G$ is reset to 0, the routine proceeds to the step S56 without any operation actually being performed.

In the step S56, the slow pressure increase/decrease period m in the actuator control routine of FIG. 9 described hereinafter is set to 1, so the target wheel cylinder pressure $P_i^*$ is calculated in the step S57. In this case, the estimated wheel cylinder pressure $P_i$ is 0, and as the target pressure increase/decrease amount $\Delta P_i^*$ is a positive value, $P_i + \Delta P_i = \Delta P_i^*$ is set to the target wheel cylinder pressure $P_i^*$. However, as the master cylinder pressures $P_{MCF}$, $P_{MCR}$ are both 0, the target wheel cylinder pressure $P_i^*$ in the step S58 is 0, and this value is stored in the memory 20c.

Next, the actuator control routine of FIG. 9 is executed, but as the target wheel cylinder pressure $P_i^*$, and the master cylinder pressures $P_{MCF}$, $P_{MCR}$ are all 0, the determination result of the step S61 is affirmative, and the routine proceeds to the step S65 via the steps S62–S64. In this process AS is reset to 0, the pressure increase/decrease time $T_p$ is set to 1, and the slow pressure increase/decrease period m is set to 1 in the step S64.

In the step S65, as $T_p=1$, the routine proceeds to the step S66, and $T_p$ is reset to 0. In the step S67, a pressure increase signal at which EV and AV are both 0 is output. The wheel cylinders 2FL, 2FR, 2RL, 2RR are therefore connected to the master cylinder 5. However, as the brake pedal 14 is not depressed, the pressure of the master cylinder 5 is 0, and the pressures of the wheel cylinders 2FL, 2FR, 2RL, 2RR are also 0. In other words, no braking force is generated, and the non-braiding state continues.

Figure 10:
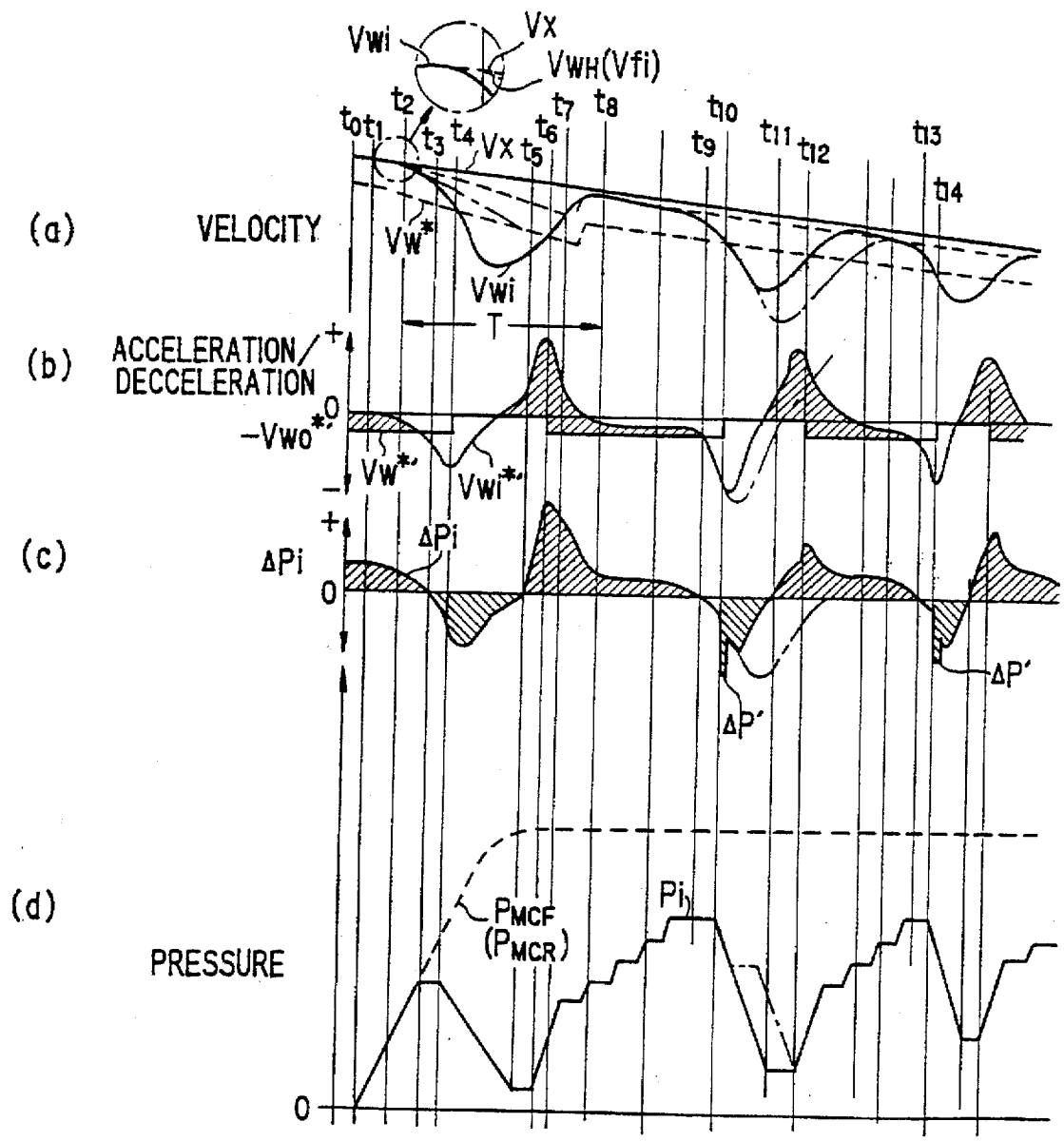
FIG. 10 is a timing chart showing one example of antiskid control according to this invention.

From the fixed speed running state, the brake pedal 14 is depressed at a time $t_1$ in FIG. 10. In this case, when the vehicle speed estimating routine of FIG. 5 is executed, the routine proceeds from the step S7 to the step S11. As a result, the select-high wheel speed $V_{W_H}$ is selected, and the wheel deceleration $V_{W_H}'$ is computed in the step S12 based on this.

Immediately after braking begins, a flag F1 showing whether or not the wheel deceleration $V_{W_H}'$ exceeds the set deceleration $-D_S$ is 0, the determination result of the step S13 is non-affirmative, and the routine proceeds to the step S14. At this time, the wheel deceleration $V_{W_H}'$ has not reached the set deceleration $-D_S$, so the determination result of the step S14 is also non-affirmative, and the select-high wheel speed $V_{W_H}$ becomes equal to the vehicle speed slope $V_{XK}$ in the step S15.

Due to the depression of the brake pedal 14, the master cylinder pressures $P_{MCF}$, $P_{MCR}$ increase sharply. As the estimated wheel cylinder pressure $P_i$ on the immediately preceding occasion is 0, the estimated pressure increase $\Delta P_{iA}$ computed in the wheel cylinder pressure estimating routine of FIG. 6 depends only on the master cylinder pressures $P_{MCF}$, $P_{MCR}$, and the present estimated wheel cylinder pressure $P_{i(n)}$ becomes equal to the master cylinder pressures $P_{MCF}$, $P_{MCR}$.

Hence, when the target wheel cylinder pressure computation routine of FIG. 7 is executed, the wheel deceleration $V_{W_H}'$ increases. The target pressure increase/decrease amount $\Delta P_i^*$ still retains a positive value at this time as shown in FIG. 10(c), and as the estimated wheel cylinder pressure $P_i$ has increased, the target wheel cylinder pressure $P_i^*$ computed in the step S57 is a larger value than the master cylinder pressures $P_{MCF}$, $P_{MCR}$. However in the step S58, the master cylinder pressures $P_{MCF}$, $P_{MCR}$ are set equal to the target wheel cylinder pressure $P_i^*$, and this value is stored in the memory 20c.

In the actuator control routine of FIG. 9, therefore, the target wheel cylinder pressure $P_i^*$ is identical to the master cylinder pressures $P_{MCF}$, $P_{MCR}$, and the pressures of the actuators 6FL, 6FR, 6R continue increasing. Consequently, the wheel speeds $V_{W_i}$ of the rear wheels 1FL, 1FR, 1RL, 1RR begin decreasing at a time $t_1$ as shown in FIG. 10(a). In FIG. 10, for the sake of simplicity, it is assumed that all of the wheels behave in the same way.

At a time $t_2$, the wheel deceleration $V_{W_H}'$ reaches the set deceleration $-D_S$. As a result, in the vehicle speed estimating routine of FIG. 5, the processing of the steps S16–S18 is performed after the step S14. In other words, the select-high wheel speed $V_{W_H}$ at this time is stored as an initial sampling wheel speed $V_{S_0}$ in the memory 20c, the timer T is reset to 0, and the flag F1 showing whether or not the vehicle is in the braking state is set to 1. In the step S15, the estimated vehicle speed $V_X$ is maintained at the select-high wheel speed $V_{W_H}$.

Hence when this routine is executed on the next occasion, since the flag F1 showing that the wheel deceleration has exceeded the predetermined value is 1, the routine proceeds from the step S13 to the step S18A, and after the timer value T is incremented, the determination of the step S19 is performed. As the antiskid control flag AS is still reset to 0, the routine proceeds to the determination of the antiskid control start flag F2 in the step S27. However, as the flag F2 is also 0, the determination of the step S29 is performed. While the pressure of the wheel cylinder is increasing, the select-high wheel speed $V_{W_H}$ is less than the estimated vehicle speed $V_X$ stored on the immediately preceding occasion, so in the step S29, $V_{W_H} < V_X$ and the routine proceeds to the vehicle speed slope $V_{XK}$ (=set value $V_{XK_0}$) by the sampling time $\Delta t$, from the step S30. Here the result of subtracting a value, obtained by multiplying the select-high wheel speed $V_{W_H}$, is stored as a new estimated vehicle speed $V_X$ in the memory 20c. Hence, the estimated vehicle speed $V_X$ is gradually decreased with a slope of the set value $V_{XK_0}$ as shown by the dotted line in FIG. 10(a). The target wheel speed $V_W^*$ also decreases accordingly, and the wheel deceleration $V_{W_H}'$ also increases in a negative direction as shown in FIG. 10(b).

The target pressure increase/decrease amount $\Delta P_i^*$ computed in the step S51 of the target wheel cylinder pressure computation routine of FIG. 7, therefore decreases as shown in FIG. 10(c), and after it has become 0 at a time $t_3$, it increases further in a negative direction.

During this time, when the wheel speed estimating routine of FIG. 5 is executed, the processing from the step S13 to the step S30 is performed via the steps S19, S29, and the estimated wheel speed $V_X$ decreases with the vehicle speed slope $V_{XK0}$.

When the target pressure increase/decrease amount $\Delta P_i^*$ becomes 0 at a time $t_3$, the estimated wheel cylinder pressure $P_i$ is equal to the target wheel cylinder pressure $P_i^*$, and the estimated wheel cylinder pressure $P_i$ stops increasing. On the other hand as the master cylinder pressures $P_{MCF}$, $P_{MCR}$ continue increasing as shown by the dotted line in FIG. 10(d), in the actuator control routine of FIG. 9, the target wheel cylinder pressure $P_i^*$ is not identical to the master cylinder pressures $P_{MCF}$, $P_{MCR}$. As a result, the routine proceeds from the step S61 to the step S72, and by subtracting 1 from the slow pressure increase/decrease period m which was set to 1 on the immediately preceding occasion, the slow pressure increase/decrease period m becomes 0. The routine therefore proceeds from the step S73 to the step S74, and as the difference $P_{err}$ between the target wheel cylinder pressure $P_i^*$ and the estimated wheel cylinder pressure $P_i$ is 0, the processing from the step S75 to the step S76 is also executed. In the step S76, the computation of the aforesaid equation (16) is performed, but as $P_{err}$ is 0, the pressure increase/decrease time $T_p$ is 0. The routine therefore proceeds from the step S78 to the step S79, the slow pressure increase/decrease period m is set to 1, and the routine reaches the step S68 via the step S65.

In the step S68, the inflow valve 8 and outflow valve 9 are shut, a hold signal wherein AV=0 at EV=1 is output, the connection between the wheel cylinders 2FL, 2FR, 2RL, 2RR and the master cylinder 5 is cut, and the wheel cylinders 2FL, 2FR, 2RL, 2RR maintain their pressures.

In this hold mode, in the wheel cylinder pressure estimating routine of FIG. 6, the routine is terminated after the step S42, and the wheel cylinder pressure $P_i$ on the immediately preceding occasion is maintained.

Further, when the target wheel cylinder pressure computation routine of FIG. 7 is executed, the target pressure increase/decrease amount $\Delta P_i^*$ computed In the step S51 increases in the negative direction as shown in FIG. 10(c). While the target wheel speed $V_W^*$ is equal to or below the wheel speed $V_{W_i}$, therefore, the target pressure increase/decrease $\Delta P_i^*$ is limited to 0 in the step S53. As $F_G$ is 0 in the step S55, the minimum pressure decrease amount computation routine is not actually performed.

In the actuator control routine of FIG. 9 on the immediately preceding occasion, the slow pressure increase/decrease period m was set to 1, so the routine proceeds from the step S56 to the step S57 and the present estimated wheel cylinder pressure $P_i$ is stored as the target wheel cylinder pressure $P_i^*$.

Hence, when the actuator control routine of FIG. 9 is executed, a hold signal is output in the step S68 as on the immediately preceding occasion when the routine is executed.

When the wheel speed $V_{W_i}$ decreases and falls below the target wheel speed $V_W^*$ at a time $t_4$, the target wheel deceleration $V_{W}^{*'}$ is set to 0 in a step S4B of the main routine of FIG. 4.

In this state, the target wheel cylinder pressure computation routine of FIG. 7 is executed. The target pressure increase/decrease amount $\Delta P_i^*$ computed in the step S51 continues to increase in a negative direction as shown in FIG. 10(c), and the target wheel speed $V_W^*$ becomes larger than the wheel speed $V_{W_i}$. Processing is therefore performed in the order of the steps S52, S54, S54B.

Here, as the hold flag $F_H$ is set to 1, the routine proceeds to the step S54C, and as the slow pressure increase flag $F_Z$ is 0, the flag $F_H$ is reset to 0 in a step S54D. In the step S55, as the pressure reduction flag $F_G$ is still 0, the minimum pressure reduction computation routine is not actually performed. The target wheel cylinder pressure $P_i^*$ calculated in the steps S57, S58 is then a value obtained by adding the target pressure increase/decrease amount $\Delta P_i^*$, which has a negative value, to the estimated wheel cylinder pressure $P_i$.

In the actuator control routine of FIG. 9, therefore, the computed $P_{err}$ of the step S74 becomes a negative value, and the calculation of the aforesaid equation (17) is performed in the step S77.

As a result, a negative pressure increase/decrease time $T_p$ is set according to the estimated wheel cylinder pressure $P_i$ before the pressure began decreasing. Next, after the step S78, the slow pressure increase/decrease period m is set to the predetermined value $m_0$ in the step S82. Also, the slow pressure increase state flag $F_Z$ is reset to 0 in the step S83, and after the step S65, the antiskid control flag AS is set to 1 in the step S69. In the step S70, 1 is added to the negative pressure increase/decrease time $T_p$ and stored, and in the step S71, a pressure decrease signal wherein EV=1, AV=1, MR=1 is output.

As a result, the inflow valve 8 is shut, the outflow valve 9 opens and the pump 10 begins operating. Working oil in the wheel cylinders 2FL, 2FR, 2RL, 2RR is forcibly discharged to the master cylinder 5, and the cylinder pressure begins to fall as shown in FIG. 10(d).

While the pressure is decreasing, the steps S42 to S48–S50 of the wheel cylinder pressure estimating routine of FIG. 6, are performed. In other words, the estimated pressure decrease amount $\Delta P_{iD}$ is calculated based on the estimated wheel cylinder pressure $P_{i(n-1)}$ on the immediately preceding occasion, $\Delta P_i^*$ is subtracted from $P_{i(n-1)}$ so as to compute the present estimated wheel cylinder pressure $P_{i(n)}$, and this value is stored.

Further, as the antiskid control flag AS is set to 1 in the step S69 of the actuator control routine of FIG. 9, the elapsed time T is incremented in the step S18A of the estimated vehicle speed computing routine of FIG. 5, and the processing of the steps S19–S21B is performed. In other words, in the step S20, the flag F2 showing whether or not antiskid control has begun is set to 1. As the flags F3 and F4 are both still reset, the routine proceeds from the step S21 via the step S21A to the step S21B. As the acceleration $V_{W_H}'$ of the select-high wheel speed $V_{W_H}$ is still negative, the routine proceeds to the step determination of the S29. Here the select-high wheel speed $V_{W_H}$ is less than the estimated wheel speed $V_X$, so a value obtained by multiplying the vehicle speed slope $V_{XK}$ by the sampling time $\Delta t$ is subtracted from the select-high wheel speed $V_{W_H}$ in the step S30, and the result is stored as the estimated vehicle speed $V_X$. Due to the continuation of the decreasing pressure mode, the wheel speed $V_{W_i}$ increases as shown in FIG. 10(a) and the target pressure increase/decrease amount $\Delta P_i^*$ again becomes 0 at a time $t_5$. As a result, $P_{err}$ calculated by the step S74 of the actuator control routine of FIG. 8 is 0. The routine then proceeds from the step S75 to the step S76, and the pressure increase/decrease time $T_p$ is set to 0. Subsequent processing therefore proceeds from the step S65 to the step S68, the actuators 6R, 6FL, 6FR change over from the decreasing pressure mode to the hold mode, and the wheel cylinder pressure is held at a fixed value as shown in FIG. 10(d).

In this hold mode, the estimated wheel cylinder pressure $P_i$ in the wheel cylinder pressure estimating routine of FIG. 6 is held at its present value as described hereintofore. Also in the target wheel cylinder pressure computation routine of FIG. 7, the target pressure increase/decrease amount $\Delta P_i^*$ increases in a positive direction as shown in FIG. 10(c), but as the target wheel speed $V_W^*$ is larger than the wheel speed $V_{W_i}$, the target pressure increase/decrease amount $\Delta P_i^*$ is limited to 0 in the step S53, and the target wheel cylinder pressure $P_i^*$ is held at its value on the immediately preceding occasion.

At a time $t_6$, when the target wheel speed $V_W^*$ is identical to the wheel speed $V_{W_i}$, processing proceeds from a step S52S via the step S54B to the step S54C in the target wheel cylinder pressure computation routine of FIG. 7. Here, as the slow pressure increase state flag $F_Z$ is 0, the hold flag $F_H$ is reset to 0 in the step S54D. Also, as the pressure reduction flag $F_G$ is still 0, the minimum pressure decrease amount computation of the step S55 is not actually performed and the target wheel cylinder pressure $P_i^*$ is set to a value exceeding the estimated wheel cylinder pressure $P_i$ the step S57.

When the actuator control routine of FIG. 9 is performed, therefore, the difference $P_{err}$ computed in the step S74 is a positive value, and the estimated wheel cylinder pressure $P_i$ increases after the time $t_6$ as in the case of the period from the time $t_1$ to the $t_3$. As the pressure increase time $T_p$ computed in the step S76 is a relatively short time, the estimated wheel cylinder pressure $P_i$ increases stepwise as shown in FIG. 10(d). In this state, $T_p>0$, so the routine proceeds from the step S78 to the step S80, the slow pressure increase period m is set to the predetermined value $m_0$, and the slow pressure increase state flag $F_Z$ is set to 1 in the step S81. At this time $t_6$, as the target pressure increase/decrease $\Delta P_i^*$ is a positive value in the target wheel cylinder pressure computation routine of FIG. 7, as shown in FIG. 10(c), processing proceeds from the step S54 to the step S54B. The hold flag $F_H$ is therefore not set to 1 in the step S54A, and the minimum pressure decrease amount computation routine of the step S55 is not actually performed.

Figure 3:
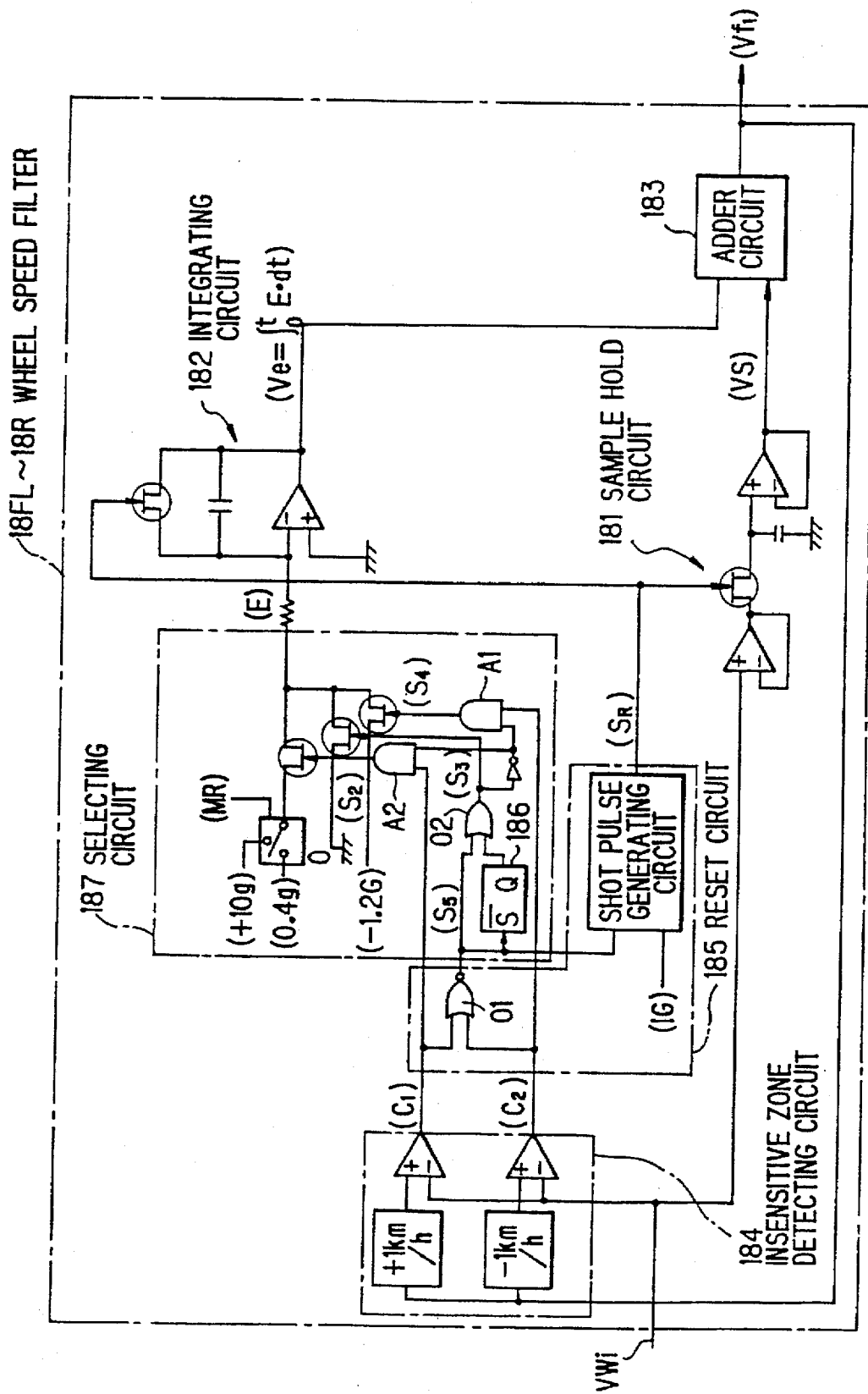
FIG. 3 is a circuit diagram of wheel speed filters according to this invention.

When the output $V_{f_i}$ of the wheel speed filters 18FL, 18FR, 18R and the wheel speed $V_{W_i}$ become effectively identical due to recovery of the wheel speed $V_{W_i}$, the filter output $V_{f_i}$ sharply increases. This is because, in the selection circuit 187 of the wheel speed filters 18FL, 18FR, 18R shown in FIG. 3, a voltage corresponding to +10 G is selected after a set delay time of an off delay timer 186 has elapsed, and this voltage is supplied to the integrating circuit 182. As this filter output $V_{f_i}$ is selected as the select-high wheel speed $V_{W_H}$, the determination result of the step S21B in the vehicle speed estimating routine of FIG. 5 is affirmative, and the flag F4 is set to 1 in the step S21C. When this routine is executed on the next occasion, therefore, the determination result of the step S21A is affirmative, and the routine proceeds to the step S22. Here, as $V_{W_H}'>-D_S$, the subtraction routine performed on the estimated vehicle speed $V_X$ continues from the step S29 to the step S30.

At a time $t_7$, when the select-high wheel speed $V_{W_H}$ exceeds the estimated vehicle speed $V_X$, $V_{W_H} \geq V_X$ in the step S29 of the vehicle speed estimating routine of FIG. 5, the flag F3 is reset to 0 in the step S31, and the select-high wheel speed $V_{W_H}$ is set to the estimated vehicle speed $V_X$ in the step S15.

On the other hand the wheel speed $V_{W_i}$ again decreases as shown in FIG. 10(a) due to increase of the wheel cylinder pressure $P_i$, and at a time $t_8$, the deceleration $V_{W_H}'$ of the select-high wheel speed $V_{W_H}$ exceeds the set value $-D_S$. As a result, in the vehicle speed estimating routine of FIG. 5, the present select-high wheel speed $V_{W_H}$ is stored as a sampling wheel speed $V_{S(n)}$ in the step S23 after the step S22.

Next, in the step S24, the computation of the aforesaid equation (5) is performed so as to compute the vehicle speed slope $V_{XKP}$, and this is stored as the vehicle speed slope $V_{XK}$ in the step S25.

Further, the flag F3 is set to 1 and the flag F4 is reset to 0 in the step S26.

The vehicle speed slope $V_{XKP}$ computed in the step S24 is a value that depends on the decrease of actual vehicle speed, and it is a smaller value than the predetermined value $V_{XK_0}$. Subsequently, therefore, the computed value $V_{XKP}$ is used as the vehicle speed slope $V_{XK}$.

In this state, when the wheel cylinder pressure estimating routine of FIG. 6 is executed, the control signal on the immediately preceding occasion is a pressure increase signal, the estimated wheel cylinder pressure on the immediately preceding occasion is a relatively large value, and as the master cylinder pressures $P_{MCF}$, $P_{MCR}$ continue to have large values, the estimated pressure increase amount $\Delta P_{iA}$ becomes a predetermined value. The estimated wheel cylinder pressure $P_i$ therefore is in a slow pressure increase condition which alternates between pressure increase and hold as shown in FIG. 10(d).

This slow pressure increase condition is repeated, and when the target wheel cylinder pressure computation of FIG. 7 is executed at a time $t_9$, the target pressure increase/decrease amount $\Delta P_i^*$ computed in the step S51 becomes 0. The system therefore enters the same hold state as at the time $t_3$. In this state, the determination result of the step S54 is affirmative, $F_H$ is set to 1 in the step S54A, and the target pressure increase/decrease amount $\Delta P_i^*$ is held at 0 in the step S53.

When the wheel speed $V_{W_i}$ becomes less than the target wheel speed $V_W^*$ from a time $t_{10}$ onwards, the routine proceeds from the step S54 to the step S54B in the target wheel cylinder pressure computation routine of FIG. 7. In the processing of the immediately preceding step, $F_H$ is set to 1, so the routine reaches the step S54C. In the slow pressure increase condition from the time $t_8$ to the time $t_9$, $F_Z$ is set to 1 in the step S81, so due to the determination of the step S54C, $F_G=1$ and $F_H=0$ in the step S54E.

Hence, in the minimum pressure decrease amount computation routine of the step S55, the determination result of the step S55A of FIG. 8 is affirmative, and the processing of the step S55B and subsequent steps is performed for the first time.

In the step S55B, 14 kg/cm² is set as a first allowable minimum pressure decrease amount $\Delta P_{i1}'$ of the front wheels 1FL, 1FR. As the rear wheel control flag $F_R$ is 0 in the step S55C, the routine proceeds to the step S55E. Here, the value of ¼ of the estimated wheel cylinder pressure $P_i$ of FIG. 6 is set as a second allowable minimum pressure decrease amount $\Delta P_{i2}'$. In this case, the vehicle is traveling on a road with a high frictional coefficient, so if the estimated wheel cylinder pressure $P_i$ is for example 100 kg/cm² which exceeds the predetermined value of 80 kg/cm², the second allowable minimum pressure amount $\Delta P_{i2}'$ is set to 25 kg/cm².

As a result, $\Delta P_{i1}'<\Delta P_{i2}'$, the routine proceeds from the step S55F to the step S55G, and after the second allowable minimum pressure decrease amount $\Delta P_{i2}'$ is set to the first allowable minimum pressure decrease amount $\Delta P_{i1}'$, it is determined in the step S55H whether or not the rear wheel control flag $F_R$ is 1. Here, as the rear wheel control flag $F_R$ is 0 as described hereintofore, in the step S55I, the smaller of the first allowable minimum pressure decrease amount $\Delta P_{i1}'$ of 25 kg/cm² and the set value of 40 kg/cm² is reset as the first allowable minimum pressure decrease amount $\Delta P_{i1}'$. The pressure decrease amount is added to the estimated wheel cylinder pressure $P_i$, so the code is updated in the step S55K.

Figure 11:
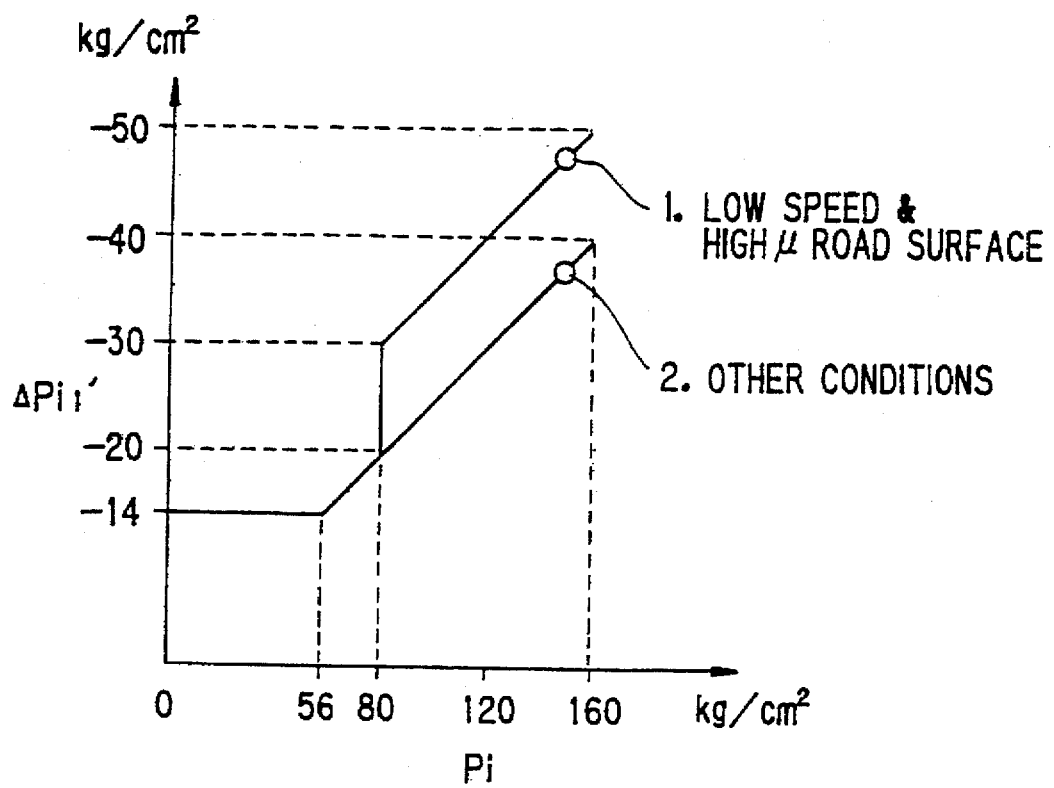
FIG. 11 is a graph showing a relation between an allowable minimum pressure decrease amount and estimated wheel cylinder pressure of a front wheel brake according to this invention.

The purpose of performing the processing from the step S55B to the step S55I, is only to select an intermediate value from an allowable minimum value of 14 kg/cm², set value of 40 kg/cm² and ¼ of the estimated wheel cylinder pressure $P_i$ as the first allowable minimum pressure decrease amount $\Delta P_{i1}'$. As a result, the allowable minimum pressure decrease amount is computed according to the wheel cylinder pressure $P_i$ immediately before beginning pressure reduction as shown by the crooked lines of FIG. 11.

In the step S55M, it is determined whether or not the vehicle is traveling at high speed. If the estimated vehicle speed $V_X$ is equal to or greater than the set value of 40 km/h, in the step S55P, the target pressure increase/decrease amount $\Delta P_i^*$ is compared with $\Delta P_{i1}'$ in the step S51 of FIG. 7, and when the target pressure increase/decrease amount $\Delta P_i^*$ is the smaller, the first allowable minimum pressure decrease amount $\Delta P_{i1}'$ is set to the target pressure increase/decrease amount $\Delta P_i^*$.

Hence, when the routine proceeds from the step S56 to the step S57, the decrease of the target wheel cylinder pressure $P_i^*$ is correspondingly larger, the pressure decrease time $T_P$ computed in the step S77 of the actuator control routine of FIG. 9 is a large negative value, and the pressure decrease time of the actuator is correspondingly longer. The wheel cylinder pressure therefore drops considerably as shown in FIG. 10(d) with the result that the wheel speed $V_{W_i}$ recovers earlier, and any excessive increase of the wheel slip factor is definitively prevented.

If the allowable minimum pressure decrease amount is not set, at the time $t_{10}$, the target pressure increase/decrease amount $\Delta P_i^*$ computed in the step S51 of the target wheel cylinder pressure computation routine of FIG. 7 is a relatively small value as can be seen from FIG. 10(c). The decrease amount of the target wheel cylinder pressure $P^*$ therefore becomes smaller, and the pressure decrease time $T_p$ computed in the step S77 of FIG. 9 becomes shorter accordingly. As a result, the decrease of the wheel cylinder pressure $P_i$ is insufficient as shown by the dotted line in FIG. 10(c), and the wheel speed $V_{W_i}$ largely decreases as shown by the dot-and-dash line of FIG. 10(a). The wheel speed does not recover until there is subsequently another pressure reduction, so the slip amount of the wheel becomes excessive, the vehicle deceleration declines, and the braking distance lengthens.

Figure 12:
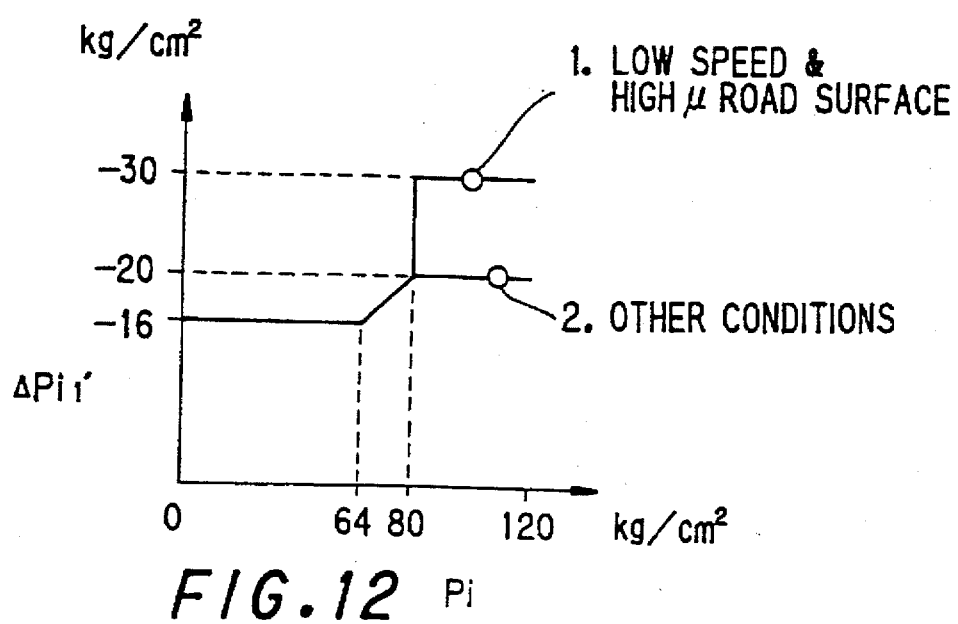
FIG. 12 is a graph showing a relation between an allowable minimum pressure decrease amount and estimated wheel cylinder pressure of a rear wheel brake according to this invention.

The aforesaid description was given insofar as it applies to the front wheels, but if the rear wheel flag $F_R$ is set to 1, the routine proceeds via the step S55D and step S55 of FIG. 8, and in this process, a value intermediate between 16 kg/cm², ¼ of the estimated wheel cylinder pressure $P_i$ and 20 kg/cm² is selected as the first allowable minimum pressure decrease amount $\Delta P_{i1}'$. In this case too, the allowable minimum pressure decrease amount $\Delta P_{i1}'$ is selected according to the estimated wheel cylinder pressure $P_i$ immediately before beginning pressure reduction as shown by the crooked lines of FIG. 12. When the target pressure increase/decrease amount $\Delta P_i^*$ does not exceed this value, pressure is reduced based on the allowable minimum pressure decrease amount $\Delta P_{i1}'$.

When the vehicle is traveling at low speed on a road with a high frictional coefficient, the determination result of the step S55M is affirmative, and in the step S55N, the estimated wheel cylinder pressure $P_i$ is determined. On a road with a high frictional coefficient the estimated wheel cylinder pressure $P_i$ is also high, and in a step S55O, the allowable minimum pressure decrease amount $\Delta P_{i1}'$ increases further by another 10 kg/cm² in a negative direction.

As a result, the target wheel cylinder pressure $P^*$ computed in the preceding step S57 is largely reduced compared to the aforesaid case when the vehicle is traveling at high speed. When the vehicle is traveling at low speed on a road with a high frictional coefficient, as pressure reduction is insufficient, the wheels tend to lock early. Under these conditions, setting the pressure reduction width to be large has a desirable effect in preventing wheel lock.

When the vehicle is braked on a road with a low frictional coefficient such as a wet road, icy road or road covered with snow, as the frictional coefficient of the road surface is small, the wheel speed $V_{W_i}$ falls considerably with a small wheel cylinder pressure. For this reason, the estimated wheel cylinder pressure $P_i$ after slow pressure increase is small. In this case, the allowable minimum pressure decrease amount $\Delta P_{i1}'$ is set to 14 kg/cm² in the step S55B, however in the step S55F, there is a high possibility that ¼ of the estimated wheel cylinder pressure $P_i$ will not exceed this allowable minimum pressure decrease amount $\Delta P_{i1}'$. In such a case, 14 kg/cm² is selected as the pressure decrease amount. Hence, even if the actuator characteristics during pressure decrease are non-linear, pressure reduction insufficiencies can be prevented by this setting of the allowable mum pressure decrease amount. Even if the road surface frictional coefficient changes sharply when the vehicle moves from a road with a high frictional coefficient to a road with a low frictional coefficient during braking, the pressure reduction width is not too small when pressure begins to be reduced on the road with low friction, and wheel lock due to pressure reduction insufficiency is definitively prevented.

When the brake pedal 4 is no longer depressed and the vehicle is not in the braking state, the master cylinder pressures $P_{MCF}$, $P_{MCR}$ are 0. In the wheel cylinder pressure estimating routine of FIG. 6, the master cylinder pressure is set to the estimated wheel cylinder pressure $P_i$ in the step S45 or S50. Simultaneously, in the target wheel cylinder pressure computing routine of FIG. 7, the master cylinder pressure is set to the target wheel cylinder pressure $P_i^*$ in the step S57. Hence, when the actuator control routine of FIG. 9 is executed, the target wheel cylinder pressure $P_i^*$ is identical to the master cylinder pressure $P_{MCF}$ or $P_{MCR}$, the routine proceeds from the step S61 to the step S62, and AS is reset to 0. Further, the pressure increase/decrease time $T_P$ is set to 1 in the step S63 and the slow pressure increase period m is set to 1 in the step S64. As a result, a pressure increase signal is output to the actuator, and the wheel cylinder and master cylinder 5 are connected together. At this time, the brake pedal 4 is not depressed, so the master cylinder pressures $P_{MCF}$, $P_{MCR}$ are 0 and the vehicle is in the non-braking state.

As described hereintofore, according to tins invention, pressure reduction insufficiencies do not occur when pressure first begins to be reduced after slow pressure increase.

If wheel lock tends to occur early as when the vehicle is traveling at low speed on a road with high frictional coefficient, an offset amount is added to the allowable minimum pressure decrease amount so that the absolute value of the allowable minimum pressure decrease amount is increased. This suppresses sharp decreases of wheel speed and makes it more difficult for wheel lock to occur.

Further, the allowable minimum pressure decrease amount is set only when pressure first begins to be reduced after slow pressure increase, pressure reduction being performed according to the target pressure increase/decrease amount based on the slip amount of the wheels when the pressure is reduced at any other time. It is therefore also difficult for excessive pressure reduction to occur.

In the aforesaid embodiment, the wheel speed filters 18FL, 18FR, 18R were connected to the output side of the wheel speed computation circuits 15FL, 15FR, 15R, and the vehicle speed slope $V_{XK}$ and estimated vehicle speed $V_X$ were computed according to these filter outputs. Alternatively however, the wheel speed filters 18FL, 18FR, 18R may be omitted, and the vehicle speed slope $V_{XK}$ and estimated vehicle speed $V_X$ computed based on $V_{W_{FL}}$, $V_{W_{FR}}$, $V_{W_R}$ output by the wheel speed computation circuits 15FL, 15FR, 15R.

Instead of estimating the pressures of the wheel cylinders 2FL, 2FR, 2RL, 2RR by the estimated wheel cylinder pressure computation routine, the wheel cylinder pressures of the wheel cylinders 2FL, 2FR, 2RL, 2RR can be directly measured by pressure sensors, and the actuators 6FL, 6FR, 6R controlled according to the detected pressures and the target wheel cylinder pressure.

Further, according to the aforesaid embodiment, the allowable minimum pressure decrease amount $\Delta P_{i1}'$ is determined by the computation routine of FIG. 8. Alternatively however, maps of the contents of FIGS. 12 and 13 may be pre-stored in the control unit, and the allowable minimum pressure decrease amount determined by referring to these control maps according to the estimated wheel cylinder pressure immediately before pressure reduction.

Further, according to the aforesaid embodiment, a 3-channel antiskid brake system was described using a single sensor 3R for detecting the wheel speed of the rear wheels. It will of course be understood that this invention applies also to a 4-channel device where the wheel speeds of the left and right rear wheels are detected separately, and the cylinder pressures of the left and right rear wheels are adjusted independently. The invention is moreover not limited to the rear wheel drive vehicle of the aforesaid embodiment, and may be applied also to a front wheel drive or four wheel drive vehicle.

Still further, the control unit CU need not be the microprocessor 20, and may instead comprise an arrangement of electronic circuits such as a comparator circuit, computing circuit, logic circuit and parameter generating circuit.

The embodiments of this invention in which an exclusive property or privilege is claimed are defined as follows:

1. An antiskid braking device for braking a wheel of a vehicle, comprising:

a brake pedal, a master cylinder that generates a pressure according to a depression amount of said brake pedal, a wheel cylinder that applies a braking force to said wheel according to the pressure of said master cylinder, means for detecting a rotation speed of said wheel, means for detecting a vehicle speed, means for detecting said braking force, means for computing a target decrease amount of said braking force based on said wheel speed and said vehicle speed, means for selecting a larger value of a predetermined minimum decrease amount and said target decrease amount, and means for decreasing said braking force according to the amount selected by said selecting means.

2. An antiskid braking device as defined in claim 1, further comprising means for determining said minimum decrease amount according to said braking force applied immediately before said decreasing means decreases said braking force.

3. An antiskid braking device as defined in claim 1, further comprising means for detecting that said vehicle is traveling on a road with a high frictional coefficient, and means for increasing said minimum decrease amount when said vehicle is traveling on a road with a high frictional coefficient and said vehicle speed is less than a predetermined vehicle speed.

4. An antiskid braking device as defined in claim 1, further comprising means for determining a target increase amount of said braking force based on said wheel speed and said vehicle speed after said decreasing means has decreased said braking force, means for increasing said braking force according to said target increase amount, and means for forcing said selecting means to select said target decrease amount before said increasing means increases said braking force.

* * * * *